Oct. 27, 1964 H. M. ZEUTSCHEL 3,153,978

OPTICAL PROJECTION SYSTEM

Filed July 12, 1960 16 Sheets-Sheet 1

INVENTOR.

HEINZ M. ZEUTSCHEL

BY

Weingarten Orenbach & Pandiscio

ATTORNEYS

INVENTOR.
HEINZ M. ZEUTSCHEL
BY
Weingarten, Orenbuch & Paradiso
ATTORNEYS

*INVENTOR.*

HEINZ M. ZEUTSCHEL

*BY*

ATTORNEYS

Oct. 27, 1964 H. M. ZEUTSCHEL 3,153,978

OPTICAL PROJECTION SYSTEM

Filed July 12, 1960 16 Sheets-Sheet 4

INVENTOR.

HEINZ M. ZEUTSCHEL

BY Weingarten, Orenbach & Pandiscio

ATTORNEYS

INVENTOR.
HEINZ M. ZEUTSCHEL
BY
Wengarten, Orenbuch & Pandiscio
ATTORNEYS

INVENTOR.
HEINZ M. ZEUTSCHEL
BY
Weingarten, Orenbuch & Pandiscio
ATTORNEYS

Oct. 27, 1964 H. M. ZEUTSCHEL 3,153,978

OPTICAL PROJECTION SYSTEM

Filed July 12, 1960 16 Sheets-Sheet 7

INVENTOR.
HEINZ M. ZEUTSCHEL
BY
Weingarten, Orenbuch & Pandiscio
ATTORNEYS

INVENTOR.
HEINZ M. ZEUTSCHEL
BY
Weingarten, Orenbuch & Pandiscio
ATTORNEYS

INVENTOR.
HEINZ M. ZEUTSCHEL
BY
Weingarten, Orenbuch & Pandiscio
ATTORNEYS

INVENTOR.
HEINZ M. ZEUTSCHEL
BY
Weingarten, Orenbuch & Pandiscio
ATTORNEYS

INVENTOR.
HEINZ M. ZEUTSCHEL
BY
Weingarten, Orenbuch & Pandiscio
ATTORNEYS

INVENTOR.
HEINZ M. ZEUTSCHEL
BY
Weingarten, Oberbeck & Pandiscio
ATTORNEYS

INVENTOR.
HEINZ M. ZEUTSCHEL
BY
Weingarten, Orenbuch & Pandiscio
ATTORNEYS

Oct. 27, 1964 H. M. ZEUTSCHEL 3,153,978

OPTICAL PROJECTION SYSTEM

Filed July 12, 1960 16 Sheets-Sheet 14

INVENTOR.
HEINZ M. ZEUTSCHEL
BY
Weingarten, Orenbuch & Pandiscio
ATTORNEYS

Oct. 27, 1964 H. M. ZEUTSCHEL 3,153,978

OPTICAL PROJECTION SYSTEM

Filed July 12, 1960 16 Sheets-Sheet 15

INVENTOR.
HEINZ M. ZEUTSCHEL
BY Weingarten, Orenbuch & Pandiscio
ATTORNEYS

Oct. 27, 1964 H. M. ZEUTSCHEL 3,153,978

OPTICAL PROJECTION SYSTEM

Filed July 12, 1960 16 Sheets-Sheet 16

INVENTOR.

HEINZ M. ZEUTSCHEL

BY Weingarten, Orenbuch & Pandiscio

ATTORNEYS 3,153,978
Patented Oct. 27, 1964

3,153,978

OPTICAL PROJECTION SYSTEM

Heinz M. Zeutschel, West Newton, Mass., assignor to Itek Corporation, Waltham, Mass., a corporation of Delaware Filed July 12, 1960, Ser. No. 42,356
16 Claims. (Cl. 88—28)

This invention relates to an optical data presentation system and more particularly to an optical projection system especially suitable for use in a data processing system of the type described and claimed in the copending application of W. Gordon Welchman, Serial No. 38,334, filed June 23, 1960, and entitled "Data Processing Apparatus."

The primary object of this invention is to provide a new system for optically projecting and magnifying a data image recorded in a photographic film chip.

A more specific object of the present invention is to provide a new optical projection system for use in a data processing apparatus which is adapted to handle individual data-bearing sheets of the type wherein at least part of the recorded data can be read optically.

A further object of the present invention is to provide a system for optically projecting data recorded on sheets of film contained within a data processing apparatus without removing said sheets from said apparatus.

These and other objects and many of the attendant advantages and features of the present invention will become better understood from the following detailed specification and the accompanying drawings which together describe a data processing apparatus embodying the present invention, said apparatus being the same as the one which is illustrated and described in said copending application Serial No. 38,334 and assigned to the assignee of this instant application.

The accompanying drawings are identified as follows.

Figures 1, 2, 3:
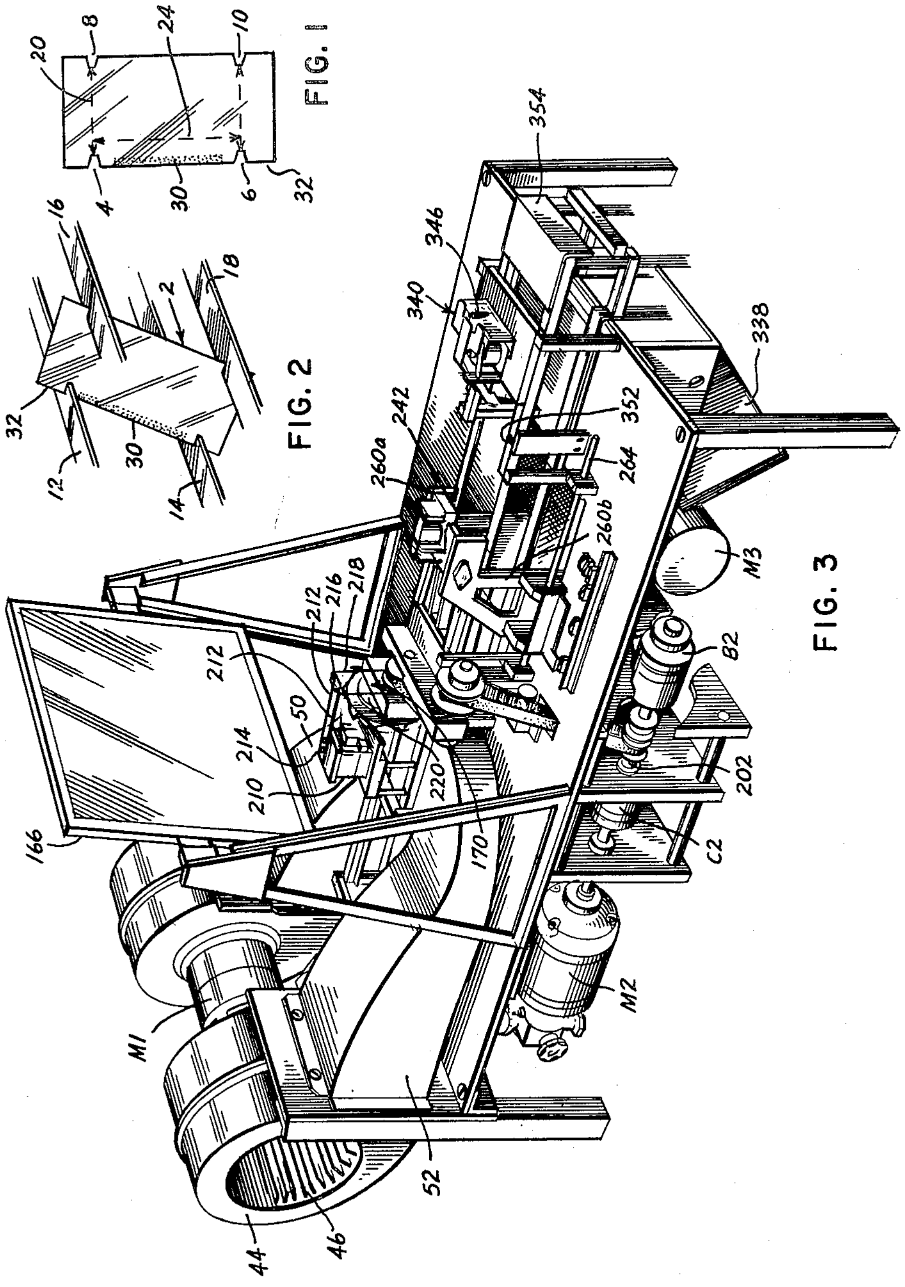
FIG. 1 is a perspective view of a data-bearing film chip of the type for which the present invention is designed.
FIG. 2 is a perspective view of a film chip mounted on the guide rail system of the data processing apparatus.
Figure 2A:
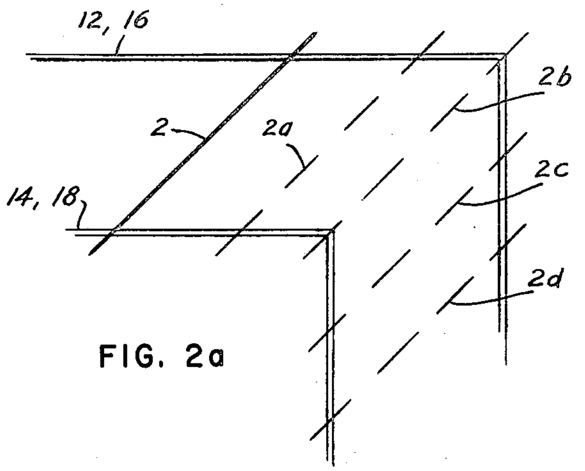
Figure 4:
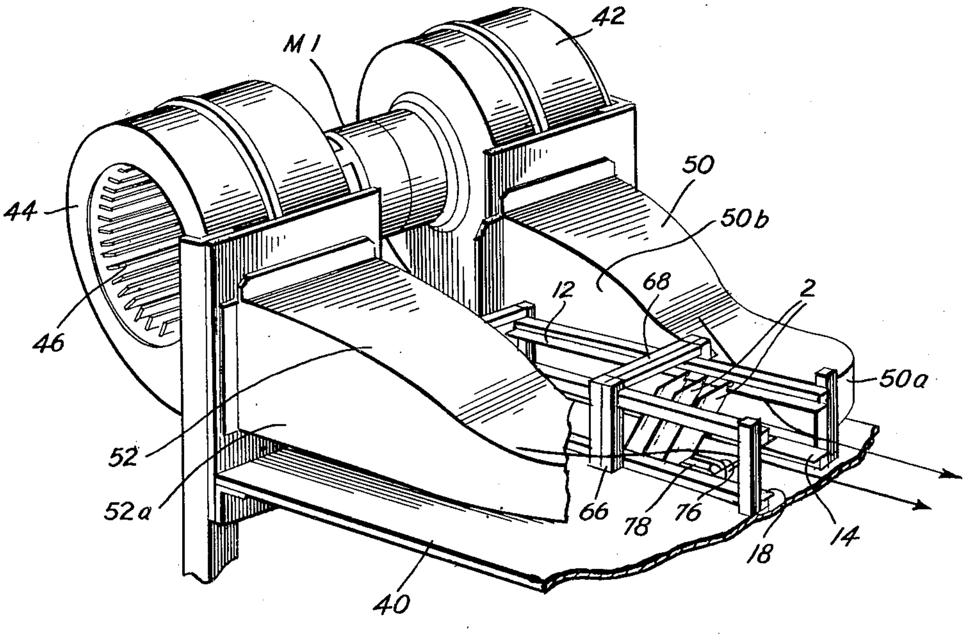
Figures 5, 6:
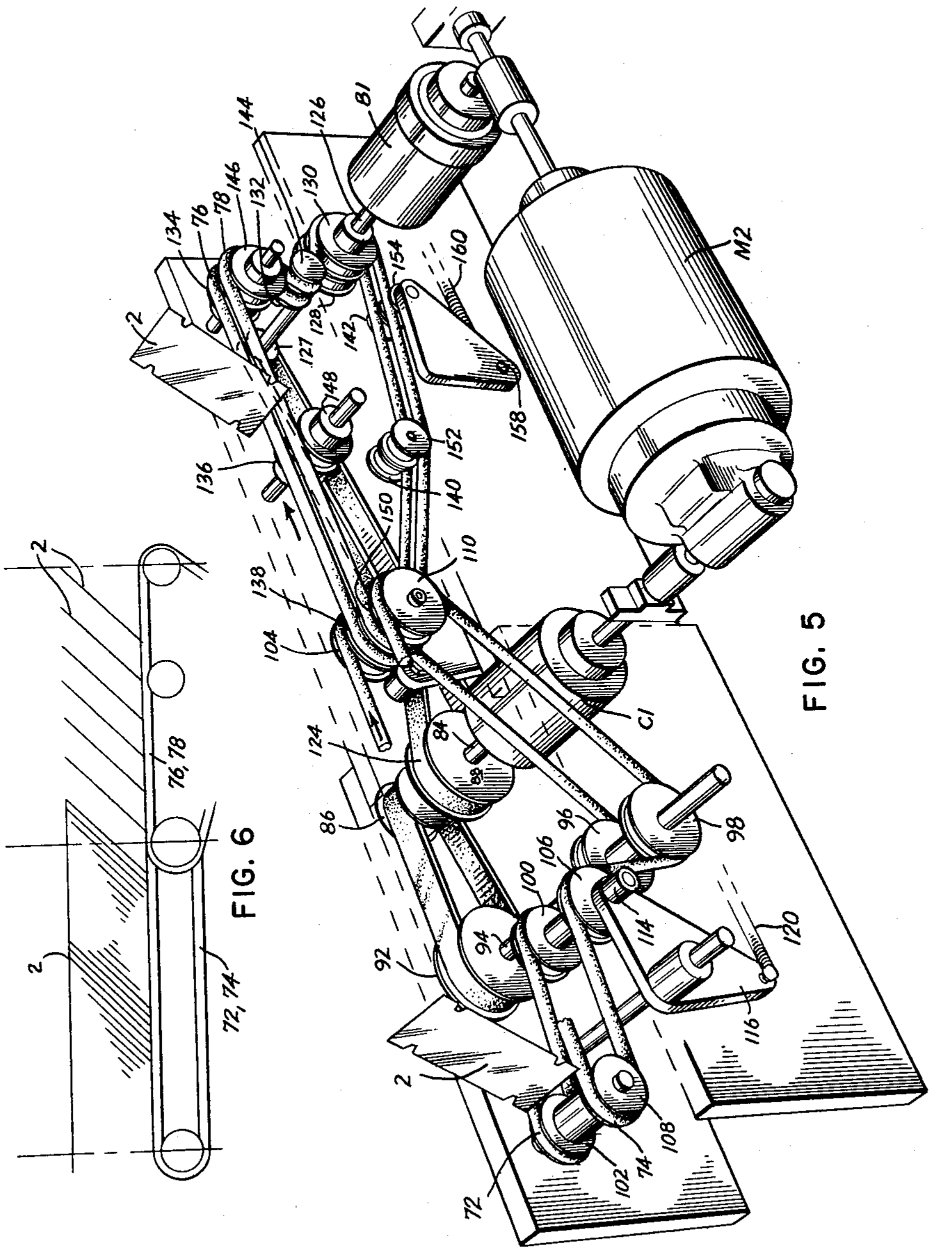

FIG. 2*a* is a schematic view illustrating how a film chip can negotiate a right angle turn in the guide rail system;

FIG. 3 is a perspective view of the overall data processing apparatus, with certain elements of the optical projection system embodying the present invention being omitted for clarity;

FIG. 4 is a fragmentary perspective view similar to part of FIG. 3 which illustrates how film chips are fed by conveyor belts into the air stream produced by a novel twin air duct system;

FIG. 5 is a perspective view showing details of the two-step conveyor belt system for feeding film chips into the air stream.

Figure 7:
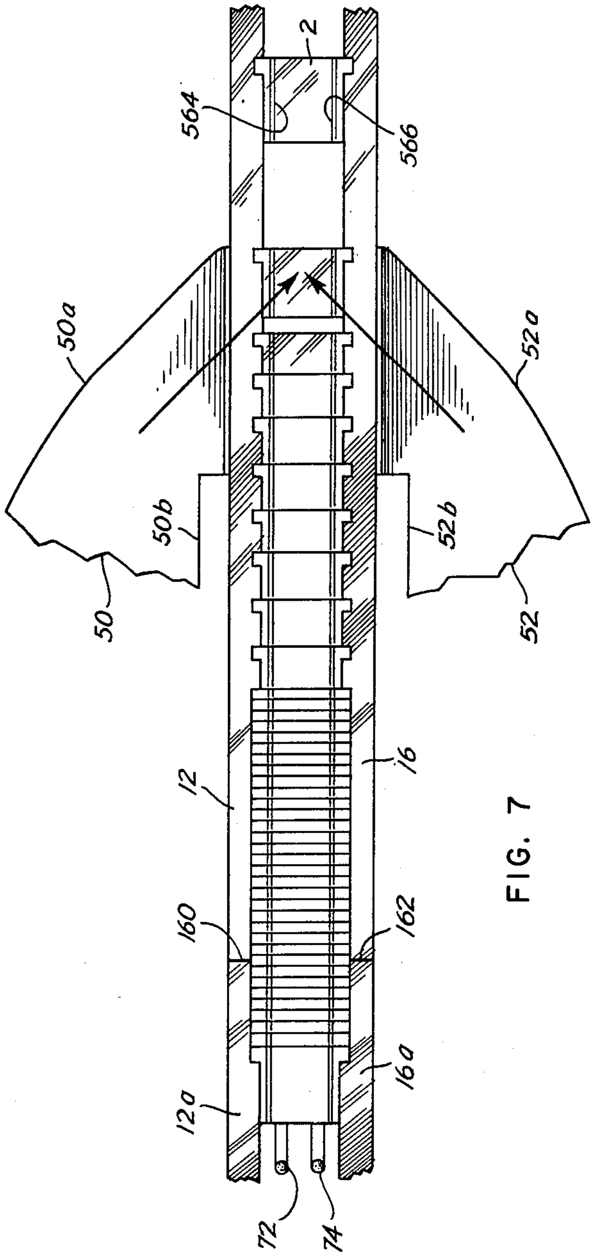
Figures 8, 9:
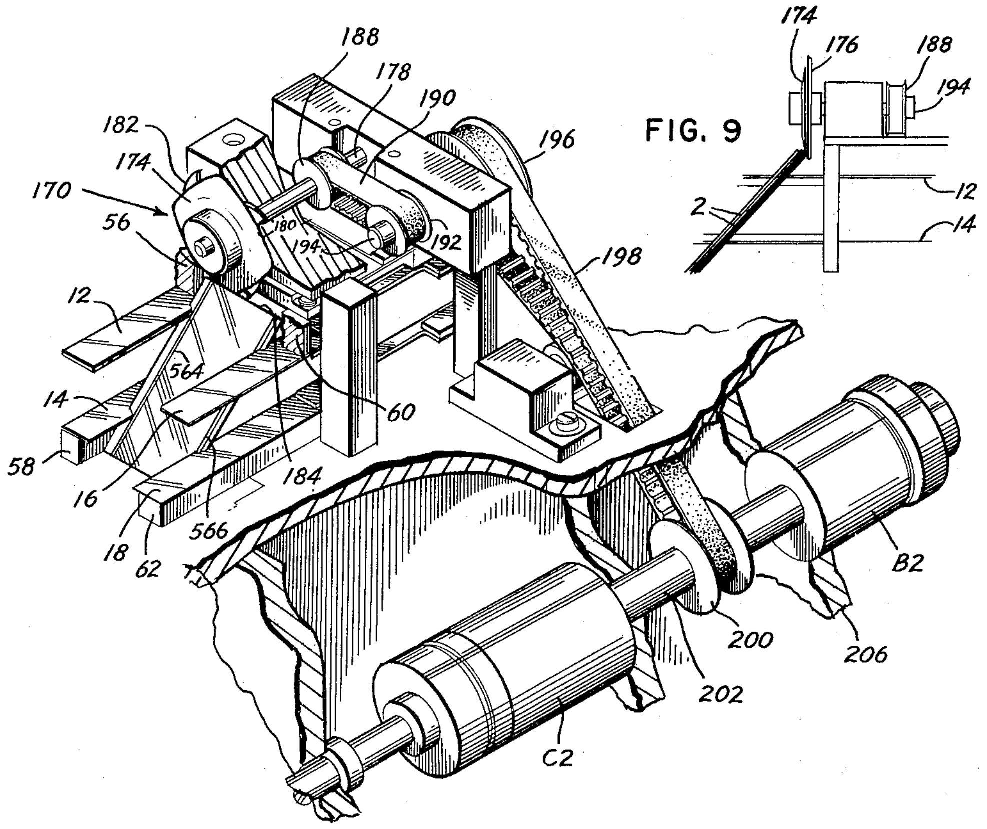
Figure 10:
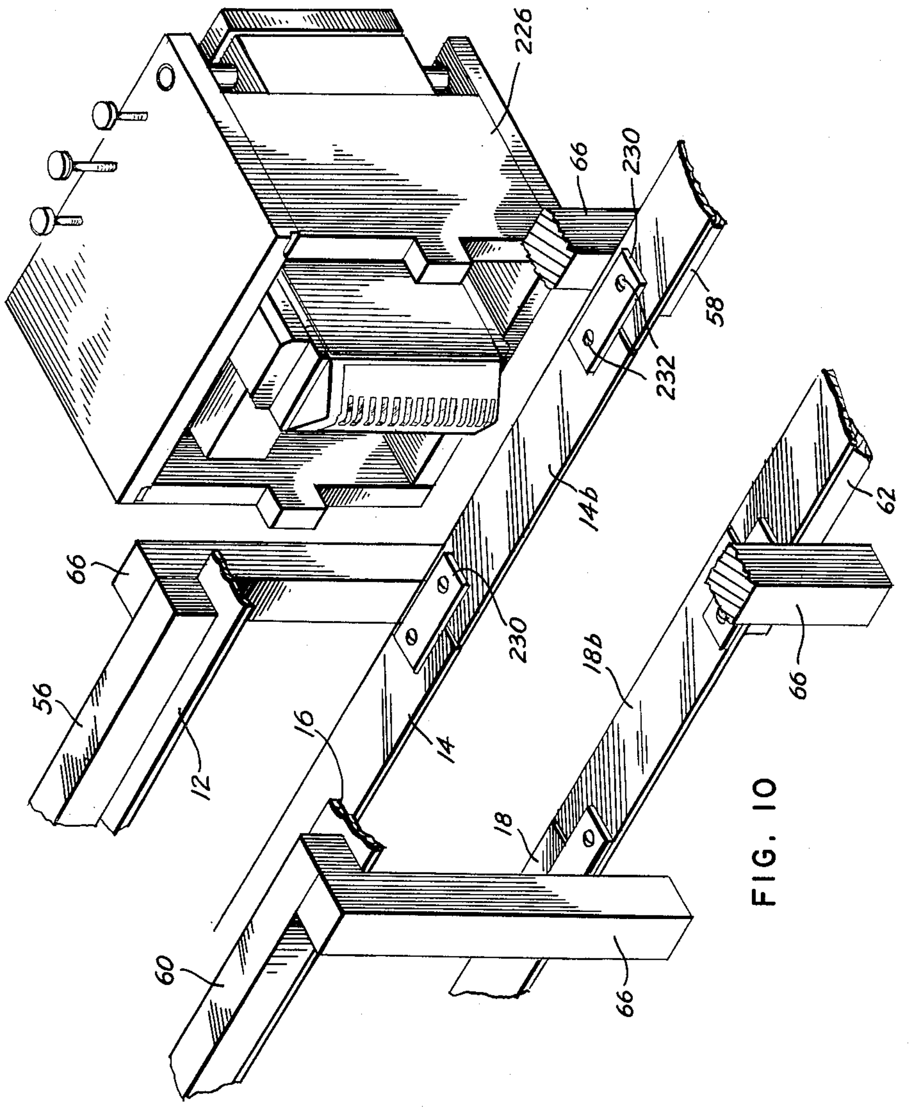
Figures 11, 13:
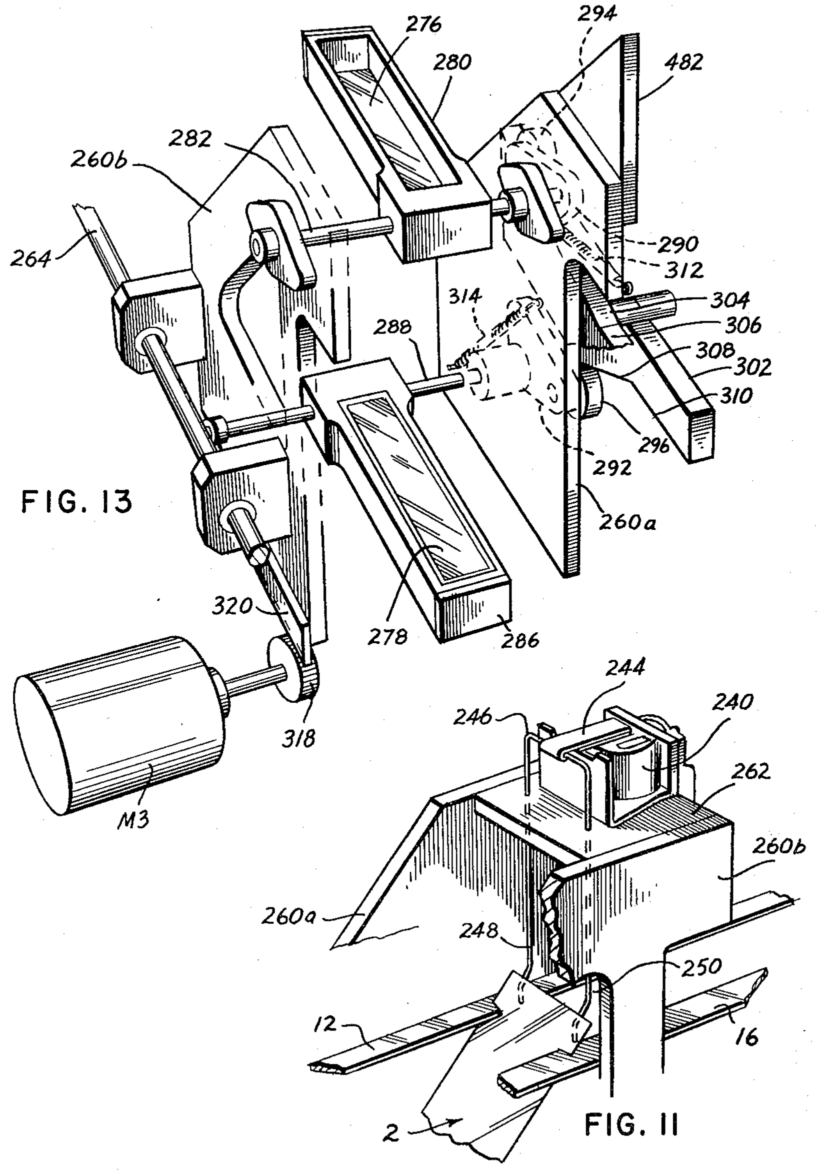
Figure 12:
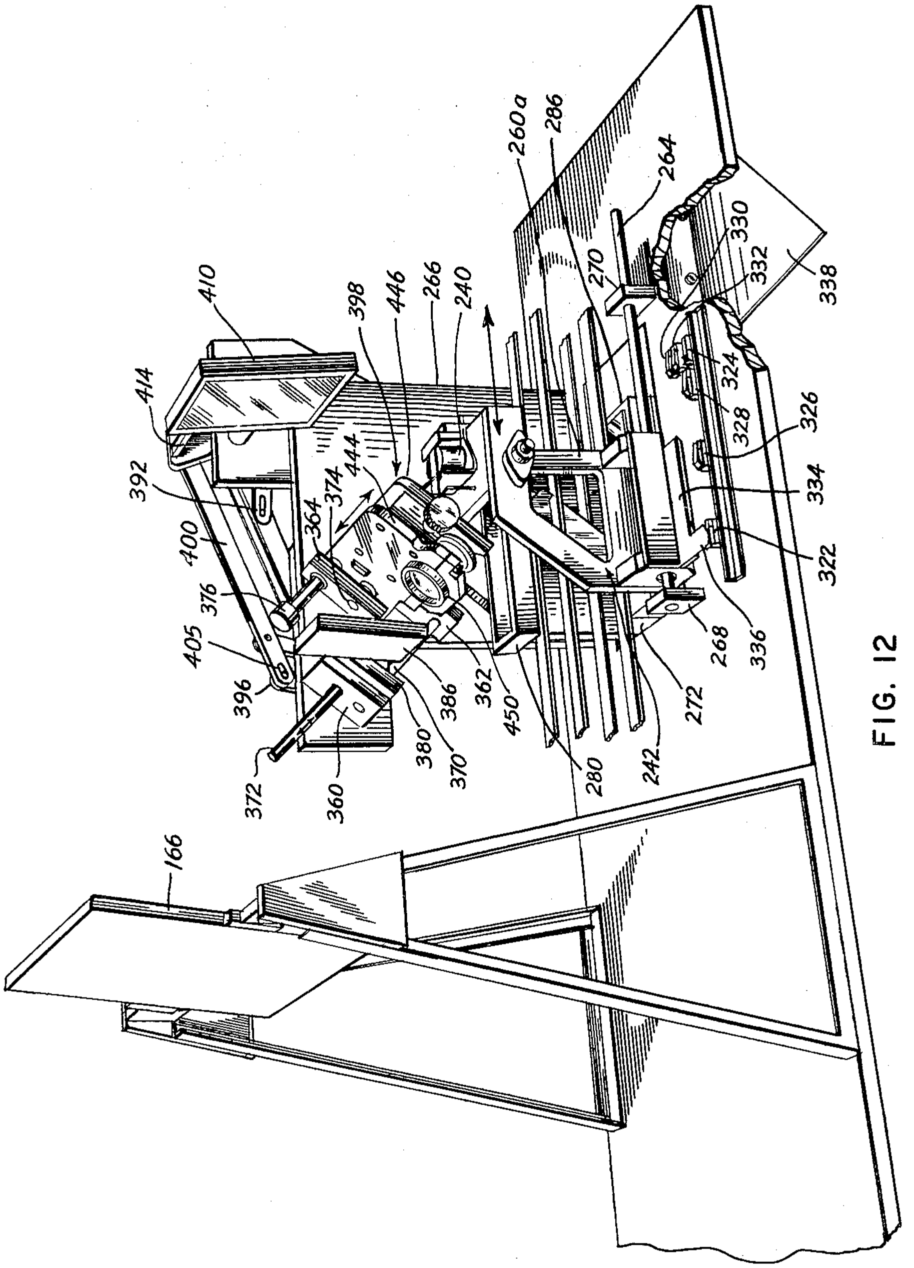
Figures 14, 15:
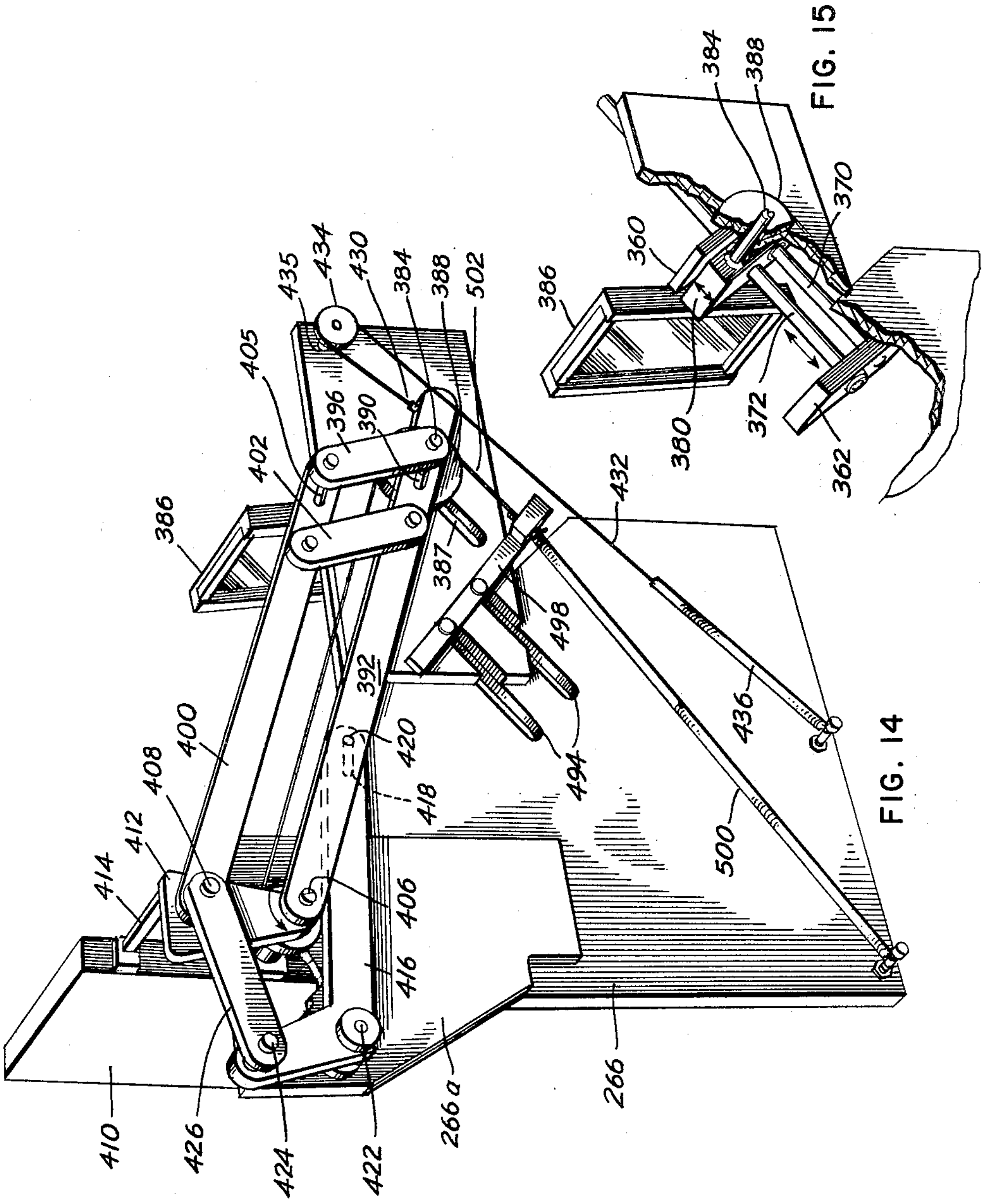
Figures 16, 17:
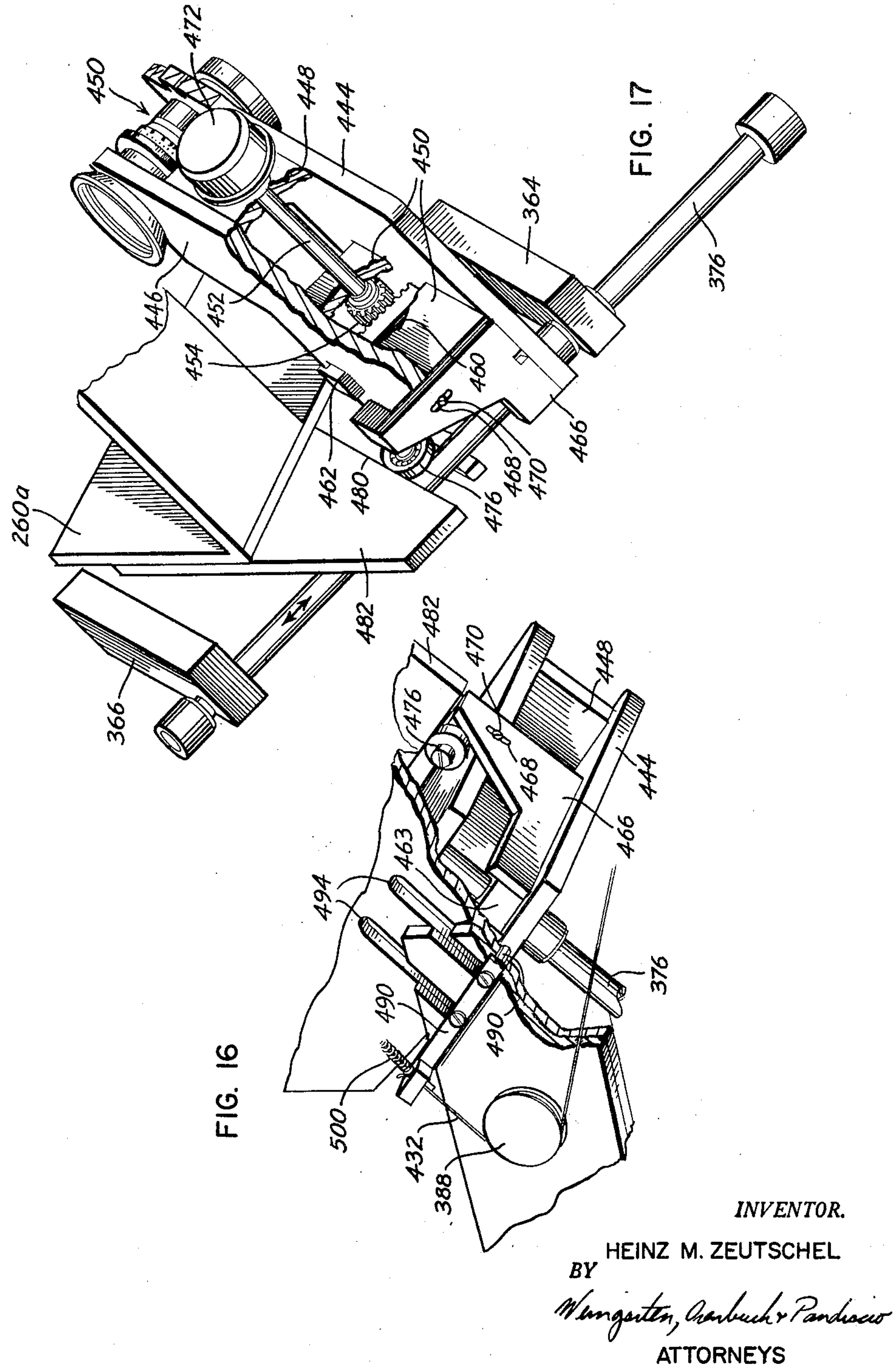
Figure 18A:
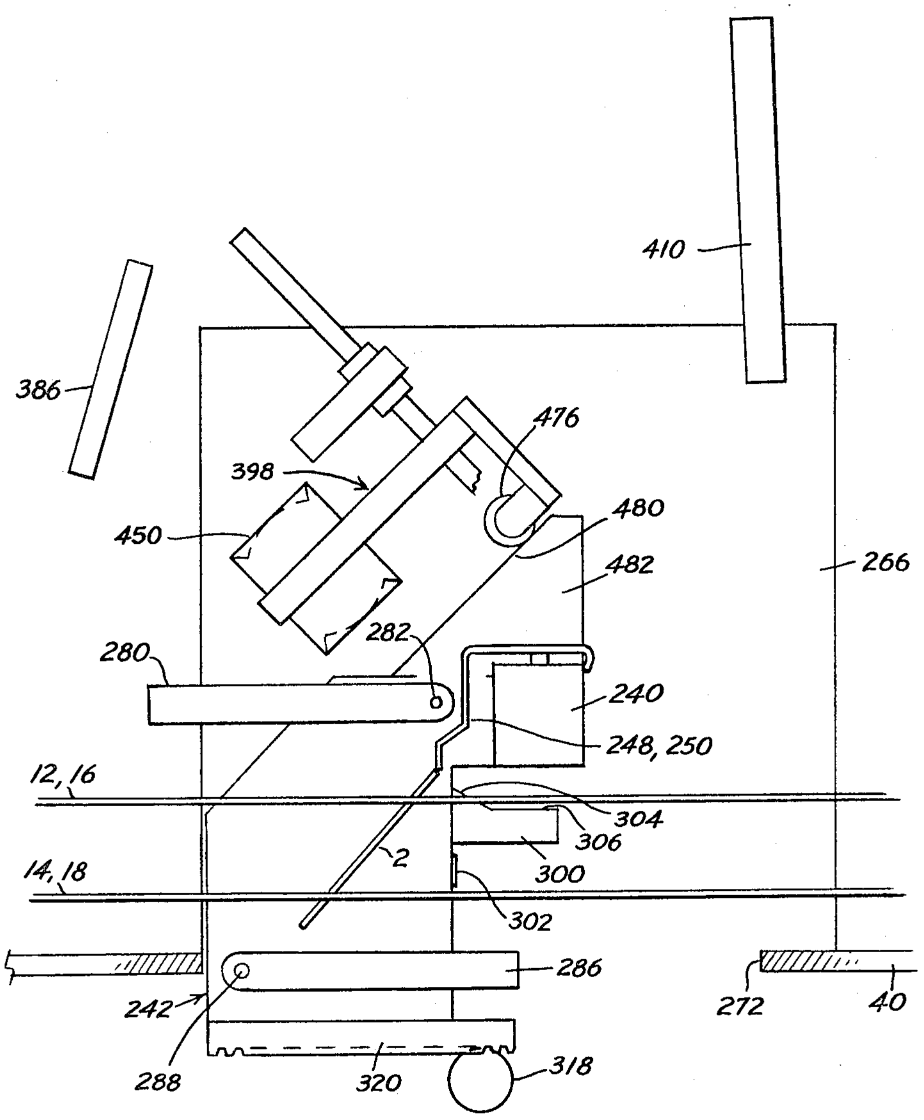
Figure 18B:
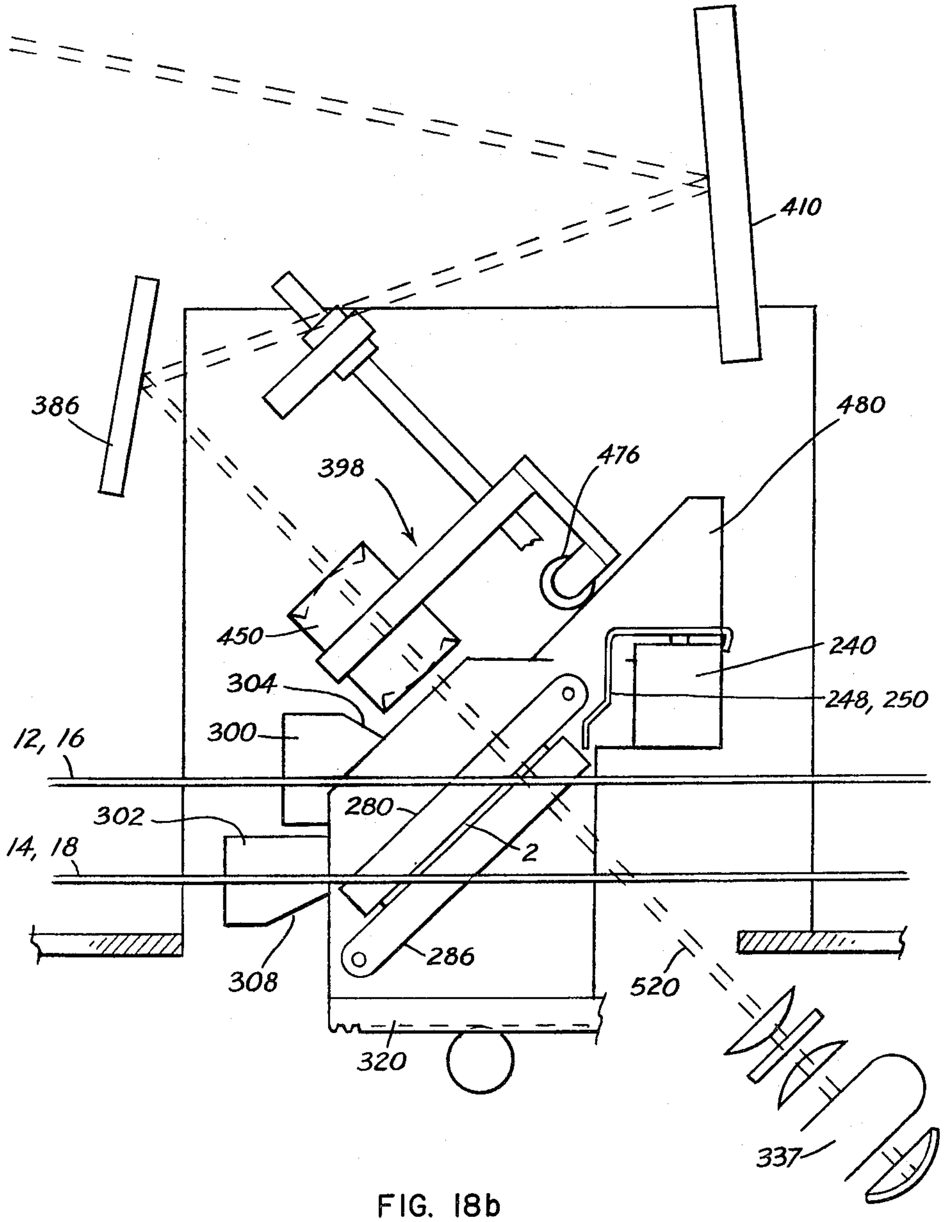
Figure 18C:
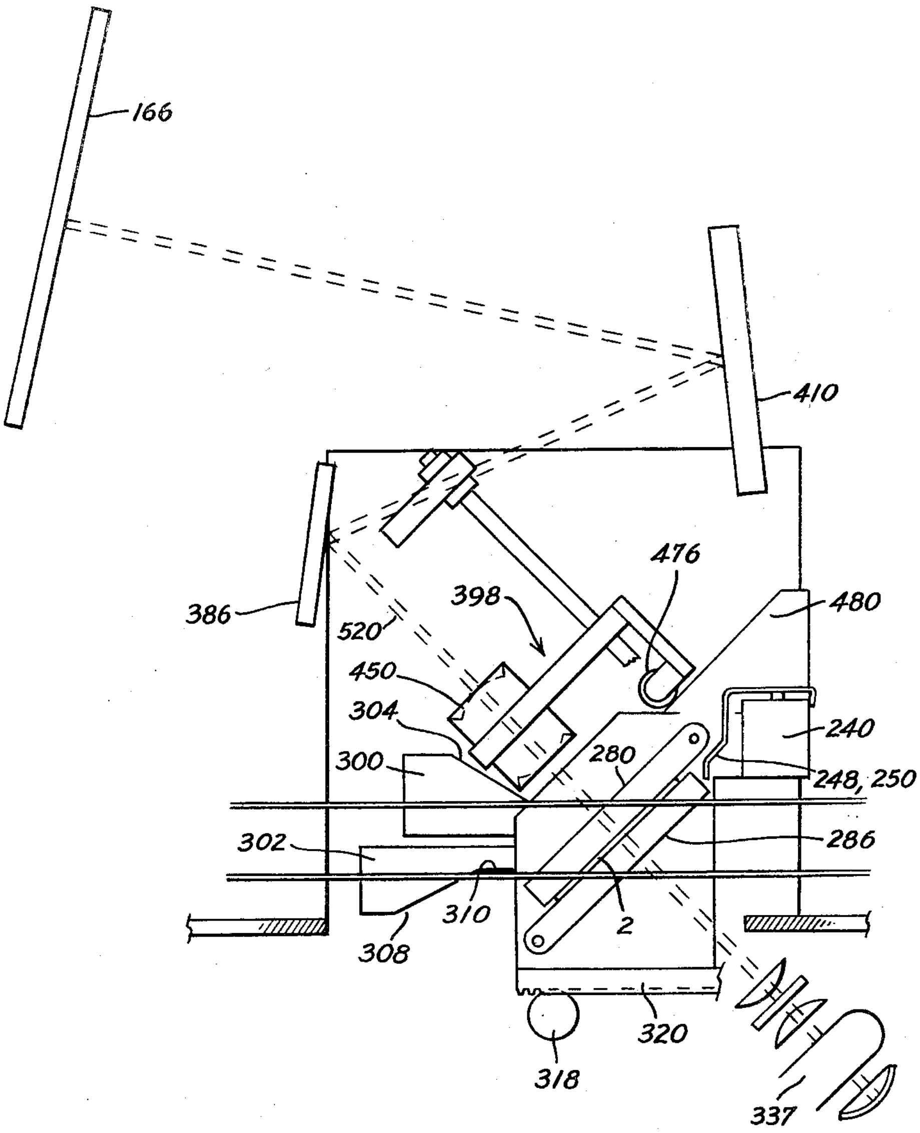
Figure 19:
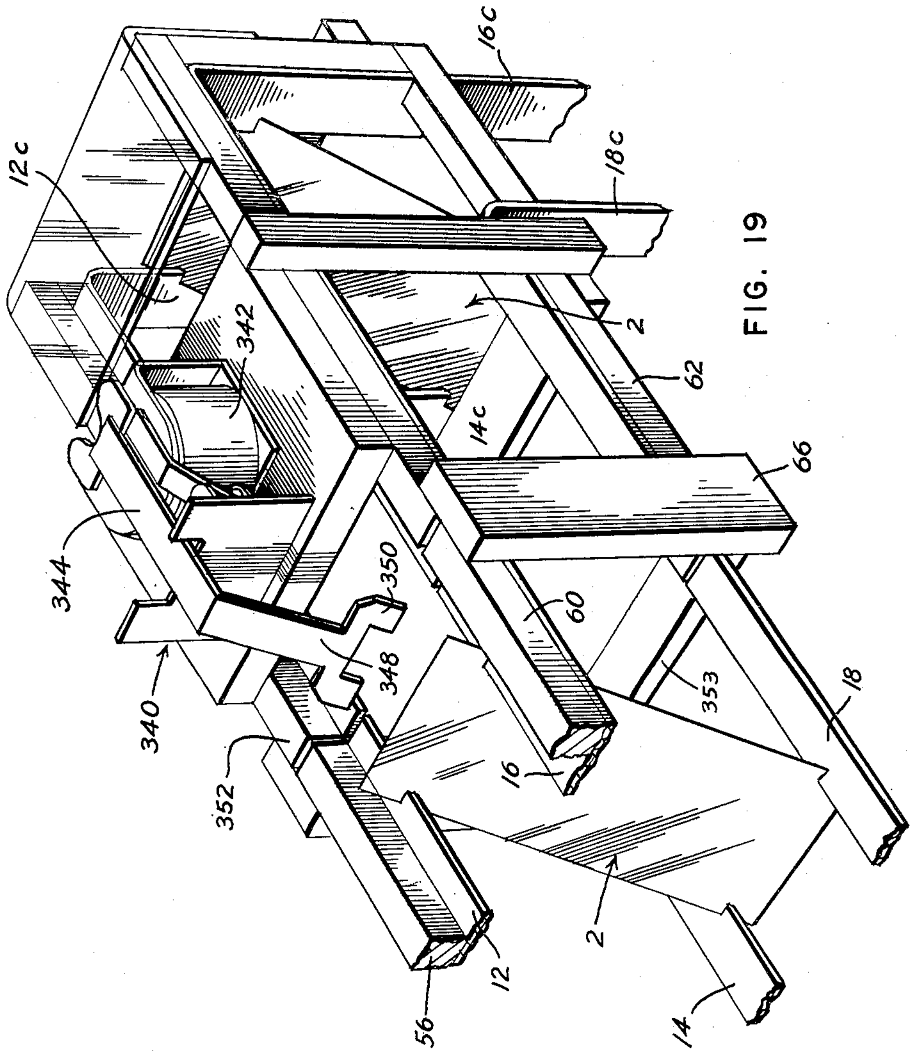
Figure 20:
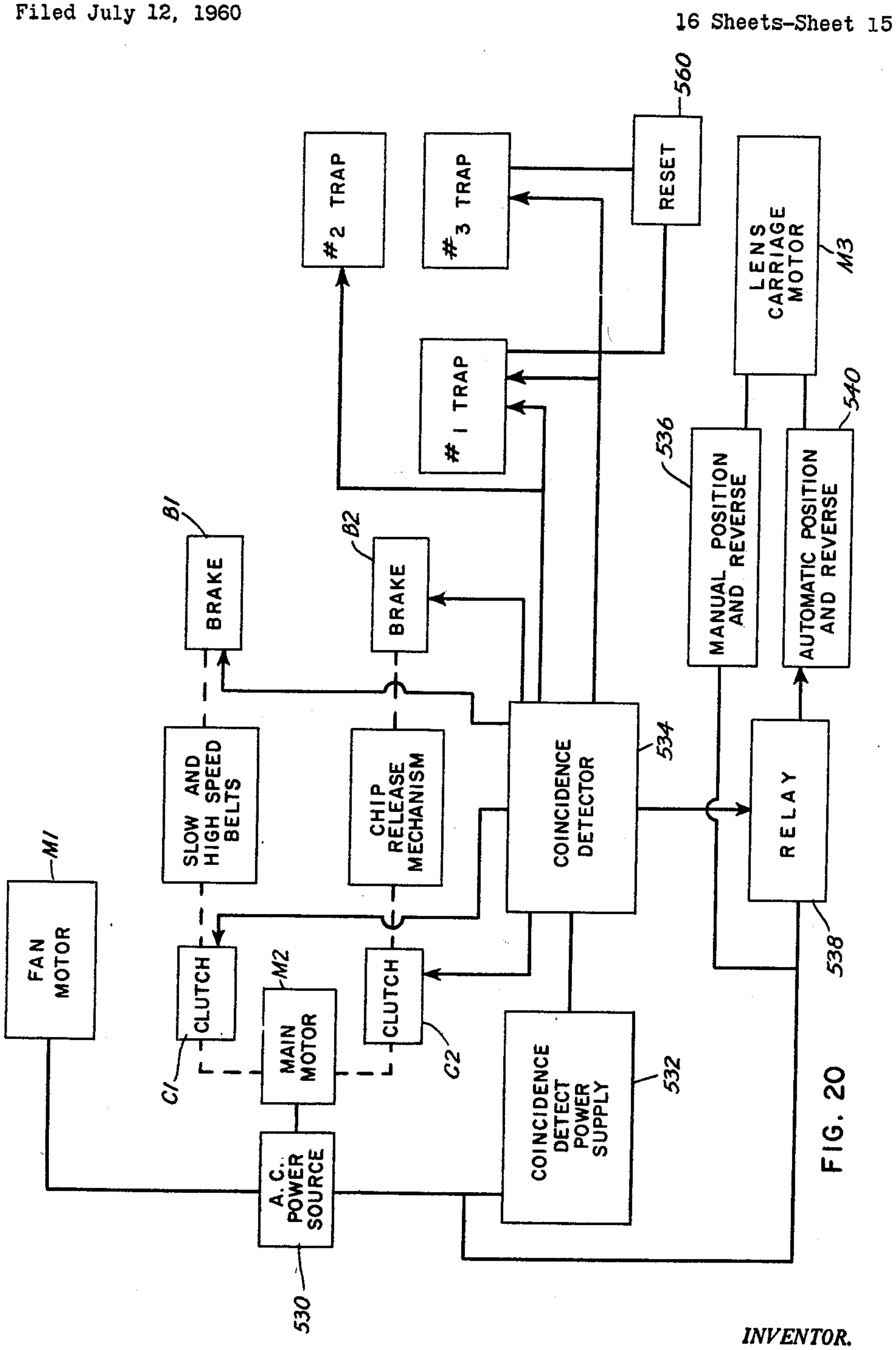
Figure 21:
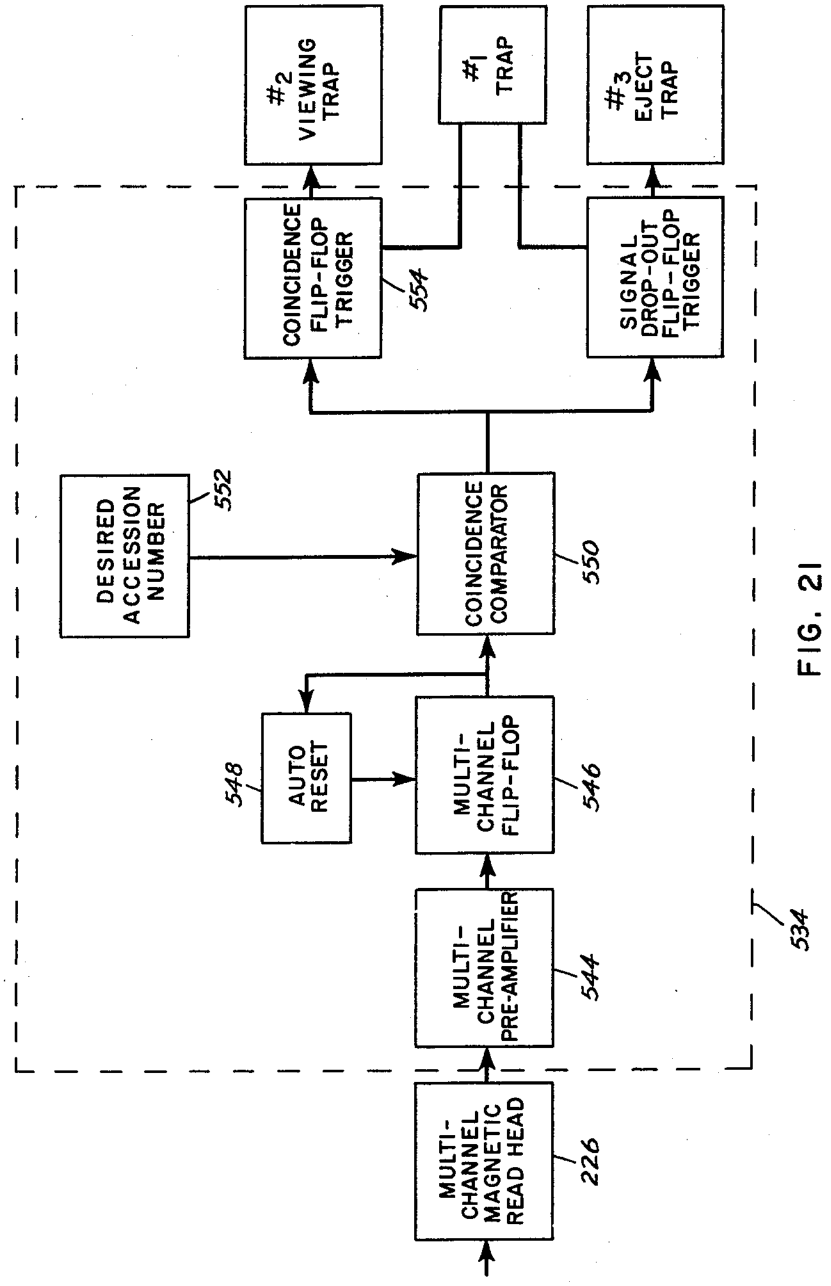

FIG. 6 is a schematic view illustrating how the film chips are spaced from one another as they are transferred from the slow feed belts to the fast feed belts;

FIG. 7 is a schematic plan view illustrating how the spacing of the film chips is changed as they pass from the feed belts into the air stream established by the twin air duct system;

FIG. 8 is a perspective view showing details of the film chip release mechanism;

FIG. 9 is a side view in elevation illustrating how the film chips tend to accumulate at the release mechanism;

FIG. 10 is a perspective view illustrating the disposition of a magnetic read head relative to the guide rail system, and also illustrating details of construction of the guide rail assembly;

FIG. 11 is a perspective view of a trap mechanism for stopping a film chip at the projection system stage;

FIG. 12 is a perspective view of a complete optical projection system embodying the present invention and incorporated into the apparatus of FIG. 3;

FIG. 13 is a fragmentary perspective view illustrating the mechanism for supporting a trapped film chip so that the latter will be in position to be projected;

FIG. 14 is a perspective view of the mechanical linkage forming part of the projection system, said linkage being mounted on a rear vertical panel of the machine;

FIG. 15 is a perspective view showing additional elements of the projection system;

FIG. 16 is another perspective view showing still other elements of the projection system;

FIG. 17 is a perspective view illustrating how the lens system may be manually adjusted to obtain proper focusing;

FIG. 18*a* is a schematic view showing the relative positions of the lens system and the mirrors when the projection carriage is in its forward at rest position;

FIG. 18*b* is a view similar to FIG. 18*a*, but with the carriage in its first intermediate position;

FIG. 18*c* is a view similar to FIG. 18*a*, but with the carriage in its second intermediate position;

FIG. 19 is a perspective view of a third trap embodied in the device of FIG. 1, plus means for directing film chips to a storage device;

FIG. 20 is a block diagram of the electrical system of the apparatus of FIG. 3; and FIG. 21 is a block diagram showing the components of the coincidence detector circuit which is employed in the electrical system illustrated in FIG. 20.

In its general organization the data processing apparatus which embodies the present invention utilizes a rectangular data-bearing sheet 2 which is provided with notches 4, 6, 8, and 10 which are sized to accommodate four guide rails 12, 14, 16, and 18, respectively. The width of the channel defined by the four rails, that is, the distance between rails 12 and 16, very closely approximates the width 20 of the data-bearing sheet, the former being only slightly greater than the latter. The width 20 is the distance between notches 4 and 8 or notches 6 and 10. However, the height of the four rail system, measured between rails 12 and 14 or rails 16 and 18, is substantially less than the height 24 of the data-bearing chip, the height 24 being measured between the notches 4 and 6 or the notches 8 and 10. Due to this difference in height, the chip can fit on all four rails simultaneously only if it is made to assume an oblique or tilted position. This tilted position is indicated in perspective in FIGS. 2 and 4 and is also indicated in profile in other figures, as, for example, FIGS. 6 and 9.

With data-bearing sheets mounted on a four rail system as indicated in FIG. 3, it is possible to transport or propel them at high speeds along the rails using simply a stream of air generated from a suitable source of air pressure. If a stream of air is directed at one side of a data-bearing sheet 2 when the latter is mounted on rails as illustrated in FIG. 2, the sheet will be moved, i.e. pushed, along the rails at a high speed. The weight of a typical data-bearing sheet and the friction between the sheet and the four rails when the data-bearing sheet is in motion are both relatively small; as a result, a relatively small air pressure gradient is required to be established along the rails in order to transport the sheet from one point to another. It has been determined that the four rails need not be enclosed in a tube or similar container so as to avoid leakage of air. Using an open four rail system as indicated in FIG. 3, velocities of an order of magnitude of 100 to 700″ per second have been achieved with relatively small air pressure magnitudes.

It has also been determined that the fit between the notches and the rails is not critical. Preferably, however, there should be little play between the sheets and the rails.

It is to be noted also that a data-bearing sheet may be inclined with its top end leading its bottom end or with its top end trailing its bottom end. This means that the data-bearing sheets may be propelled equally well irrespective of the inclination of the data bearing sheet.

An unusual feature of a four rail system for handling data-bearing sheets is that the data-bearing sheets can be made to turn a right-angled corner. The one requirement is that the data-bearing sheet be disposed so that its leading end traverses the corner on the outside rails and its trailing end traverses the corner on the inside rails. Thus, if a sheet is traveling along four horizontal rails with its top end leading, the right angle turn must be down instead of up. In other words, the corner must be such that the top leading end of the sheet will travel through a greater distance than its bottom end in rounding the corner. The remarkable thing about this is that the data-bearing sheet reverses its angular position as it turns the corner. Thus, after the data-bearing sheet has rounded the corner, its top end will be trailing its bottom end. This is shown in FIG. 2*a* where the dotted lines 2*a*, 2*b*, 2*c*, and 2*d* illustrate successive positions of a sheet 2, traveling in the direction indicated by the arrow.

A delightful result of this reversal is that a data-bearing sheet can be made to travel in the opposite direction if the original air stream is discontinued and a new oppositely flowing air stream is introduced. The data-bearing sheet will readily negotiate the corner in the opposite direction since, thanks to the aforementioned reversal, its top end will be leading its bottom end in the reverse path.

Obviously, if a data-bearing sheet can be made to turn a right-angled corner, it can be made to turn other corners also.

Of course, in order to sort or classify a plurality of data-bearing sheets, it is necessary that these sheets be provided with identification means whereby they may be distinguished one from the other and further whereby an electrical signal output may be produced for actuating means for permitting or accomplishing suitable utilization of the data on the selected sheet. The encoded identifying information may be magnetic or optical. In the illustrated data processing apparatus, the data-bearing sheets are film chips which have been severed from a roll of exposed photographic film having a ferric-oxide magnetic striping 30 (see FIG. 2) on the base side of the film near one of its edges. In this case the magnetic striping 30 is adjacent a longitudinal edge 32 which is the edge which is nearest to the magnetic sensing head hereinafter referred to and described.

The properties of the striping 30 permit coding of each film chip 2 by transverse magnetization of segments, each segment representing a single bit of a code with the various patterns of magnetization being different for individual chips. It has been feasible to employ 16 mm. film severed into lengths of approximately two inches. However, the width and length of the film chip is not critical. Thus, for example, 8 mm. film or 35 mm. film may be used equally well. Similarly, the length of the film chip may be larger or smaller, depending upon the requirements of the system with which the film chip is intended to be used. With each chip having a plurality of bits of a code recorded therein, it is preferred to utilize a magnetic transducer sensing unit having a plurality of reading heads per inch so as to permit a chip to have a large number of code bits recorded therein. A typical transducer sensing unit which has been employed is one having fourteen reading heads per inch which permits a two-inch chip to have up to approximately twenty code bits. This yields 220 possible combinations, if a single ferric-oxide stripe 30 is used.

Although in the data processing apparatus hereinafter described only a single multi-channel sensing unit is employed it is a characteristic of the system that several sensing units may be used, these sensing units being provided at various points along the guide rail network. Each sensing unit could be designed to read a specific number of bits on each film chip. In this manner, the size of each sensing unit could be reduced if the size was critical.

Turning now to FIG. 3, there is illustrated a data processing device having a projection system which embodies the present invention. For simplicity of illustration, part of the projection system has been omitted from FIG. 3. However, other figures illustrate all of the significant details of the projection system. At this point, it is to be understood that a primary advantage of the new optical projection system is that it permits viewing of the data recorded on individual film chips without removing them from the machine. On the other hand inclusion of this optical projection system in no way prevents desired film chips from being extracted from the guide rail network for use outside of the machine.

The illustrated machine comprises a flat horizontal supporting table 40 which carries all of the components of the machine, including the control and data processing circuitry illustrated diagrammatically in FIGS. 20 and 21.

Mounted at one end of the table 40 is a pair of air blowers 42 and 44 having revolving vanes 46 which are driven by a common fan motor M1. The two fans 42 and 44 are connected in parallel with two ducts 50 and 52, respectively, which curve inwardly at approximately the same point to form an air junction with a four rail system generally identified by numeral 54. As illustrated in FIGS. 3, 4, 8, 10, and 19, the four rail system consists of thin rails 12, 14, 16, and 18 which are supported by horizontal members 56, 58, 60, and 62, respectively. The latter are held in fixed relation to each other by a plurality of upstanding posts 66 and horizontal cross-members 68. It is to be noted that the rails 12, 14, 16, and 18 extend inwardly from the supporting horizontal members 56, 58, 60, and 62, by an amount sufficient so that the outside edges of the film chips will be spaced from the inside edges of members 56, 58, 60, and 62. In this way, the structure supporting the four rails presents no obstacle to free movement of the film chips along the rails.

The two ducts 50 and 52 curve inwardly toward the four rails in such a manner that the air flowing along to their outside walls 50*a* and 52*a*, respectively, enters the four rail system at an angle approximately 45° to the axis thereof. On the other hand, air flowing along next to the inner walls 50*b* and 52*b* (FIGS. 4 and 7), of the ducts enters the four rail system at an angle approximately perpendicular to the axis of the rail system. As a result, there is a slight back pressure created in the channel defined by the four rails upstream or the duct outlets, whereas on the downstream side of the duct outlets, the air streams from the two ducts produce a resultant air stream which is directed along the axis of the four rail system away from the fans. Due to the different angles at which air from the two ducts enters the four rail system, it appears that there is a definite change in air pressure and direction of air flow in the channel in the region of the outlets of the two ducts. The rapid change in pressure appears to be at approximately the midpoint of the two outlets. As a consequence, if film chips are advanced at a constant rate along the rails from the direction of the fans towards the outlet ends of the two ducts, they will continue to move at this constant speed until they reach approximately the midpoint of the two duct outlets. At this point, the leading film chip will suddenly be propelled forward due to the change in air pressure and direction of air flow. In effect, therefore, the noticeable change in air pressure and direction of air flow occurring about halfway along the zone in the channel between the two duct outlets, functions to space the film chips. This spacing is similar to the spacing which results when particles are transferred from a first conveyor traveling at a constant relatively low speed onto a second conveyor traveling at a constant relatively high speed. The difference is in the speed at which the film chips are propelled by the air stream. This speed is substantially in excess of the speeds which are achievable with belts.

As seen in FIGS. 5, 6, and 7 and also to a limited extent in FIG. 4, the machine includes a pair of low speed belts 72 and 74 and a pair of high speed belts 76 and 78. Belts 72 and 74 are mounted on a pulley system which is driven from a main motor M2.

The motor M2 has an output shaft 82 which is connected through an electromagnetic clutch C1 to a main shaft 84 which carries two main drive pulleys 86 and 88. Pulley 86 drives a belt 90 which, in turn, drives a pulley 92 mounted on a shaft 94. Shaft 94 drives two pulleys 96 and 98 which drive belts 72 and 74. It is to be noted that belt 72 travels in turn about drive pulley 96, a take-up pulley 100, and two guide pulleys 102 and 104. Similarly, belt 74 travels about drive pulley 98, a take-up pulley 106, and two guide pulleys 108 and 110. The two take-up pulleys 100 and 106 are mounted on a common shaft 114 which is carried by an arm 116 that is mounted for pivoting on a shaft 118. A tension spring 120 urges arm 116 in a direction to keep the take-up pulleys 100 and 106 in firm engagement with the belts 72 and 74 so as to substantially eliminate any slack in these belts.

The main drive pulley 88 drives a belt 124 which drives a shaft 126 through a small pulley 127 that is mounted on the end of a shaft 126. Shaft 126 is coupled to an electromagnetic brake B1 whose housing is stationary. Also mounted on shaft 128 are two drive pulleys 128 and 130 over which ride the two belts 76 and 78, respectively. These belts also ride in turn over a plurality of idler pulleys. Belt 76 rides on idler pulleys 132, 134, 136, 138, and 140. Also, belt 76 rides on a take-up pulley 142. Belt 78 rides about the aforementioned pulley 130 and also over guide pulleys 144, 146, 148, 150, and 152. Belt 78 also rides over a second take-up pulley 154. The two take-up pulleys, 142, 154, are mounted on a common shaft which is attached to an arm 156 which is pivotally mounted at 158. A tension spring 160 acts on arm 156 to maintain the two take-up pulleys 142 and 154 in tight engagement with the belts 76 and 78, thereby to eliminate any slack in the latter.

The ratios between the pulleys of the two conveyor belt systems, e.g. between pulleys 86 and 88, are such that when motor M2 is energized, the two belts 72 and 74 will be driven at a speed which is substantially lower than the speed at which the two belts 76 and 78 are driven. It is to be noted that the two pairs of belts will be driven from the motor M2 only so long as the clutch C1 is engaged. The clutch C1 is engaged only when energized. At the same time it is to be noted that if the clutch is disengaged, the belts will tend to continue traveling in the same direction. However, if at the same moment that the clutch C1 is disengaged, the brake B1 is engaged, the belts will be halted immediately so as to have little or no overtravel. Brake B1 is engaged only when de-energized. Of course, clutch C1 and brake B1 are of conventional construction, and may be replaced by suitable equivalent clutching and braking devices.

FIG. 7 illustrates how the film chips are acted upon by the belt delivery system and the air feed system. As seen in FIG. 7, the chips are generally stacked close together. Although not shown in detail, it is to be understood that the chips are assembled in a removable magazine R having rails which will be in alignment with the rails 12, 14, 16 and 18 when the magazine is in place.

In FIG. 7, numerals 12_a_ and 16_a_ designate sections of the top rails of a removable magazine R. The top rails 12_a_ and 16_a_ and the bottom rails (not shown) abut the adjacent ends of tracks 12–18 as indicated at 160 and 162. Since the magazine will have an open bottom, the bottom edges of the film chips contained therein will be exposed to and engaged by the slow speed belts 72 and 74. Assuming (1) that a stack of closely packed chips has been placed over the belts 72 and 74 by means of a suitable magazine, (2) that motor M2 is operating, and (3) that clutch C1 is now engaged, the chips will be transported forward by belts 72 and 74 with little or no spacing occurring between them. However, as soon as the chips are transferred onto the belts 76 and 78, they immediately become spaced apart. The degree of spacing is determined by the difference in relative speed between belts 76, 78 and belts 72, 74. Preferably, this initial spacing is of the order of an inch. However, it may be more or less without departing from the principles of the present invention. This initial spacing is maintained by the chips as they enter the region between the outlets of ducts 50 and 52. In this connection, it is to be noted (as seen in FIG. 4) that the fast feed belts 76 and 78 extend into the region between the outlets of the two air ducts and terminate, i.e. reverse direction, approximately at the midpoint of the outlets of the two ducts. Consequently, the chips will continue advancing into the aforementioned region even though the air flow adjacent to walls 50_b_ and 52_b_ tends to establish a back pressure in the upstream end of said region. The back pressure is not sufficient to drive the chips backward in opposition to the drag exerted by belts 76 and 78. The chips will retain their initial spacing until they reach approximately the midpoint of the duct outlets, at which point there is a sharp change in pressure, as pointed out previously. As soon as the chips are subjected to this relatively high forward air pressure, they take off and literally zoom down the rails at speeds in the neighborhood of 100 to 700 inches per second. In a typical installation this meant that the chips were fed along at the rate of 50 chips per second or approximately 3,000 per minute.

The optical projection system hereinafter described is adapted to project the data recorded on a selected chip onto a suitable viewing surface, such as projection screen 166 illustrated in FIG. 3, without removing the selected chip from the machine. Accordingly, it is necessary that some means be provided for halting the selected film chip in its path of travel in order that its data may be accurately projected. Furthermore, means must be provided for stopping successive chips at a point upstream of the stopped selected chip until the latter has been projected accurately and fully without interference.

Accordingly, reference is now had to FIGS. 3, 8, and 9 in order to observe a chip releasing mechanism generally indicated by the numeral 170. This mechanism comprises a pair of discs, a sheet separation disc 174 and a sheet releasing disc 176, both of which are securely fastened to a rotatable shaft 178 which is mounted above the four rails in parallel relation to the center line of the rectangular channel defined by these four rails. Sheet separation disc 174 is essentially four-sided in configuration and comprises four equally spaced points 180. The edge of sheet release disc 176 is so shaped as to provide four equally spaced sawtooth shaped points 182 which are arranged in alternately occurring relation with the sharp points 180 of the separation disc 174. It is to be noted that the thickness of disc 174 decreases progressively towards its edge. At its edge the disc 174 has a very small thickness, comparable to a knife edge. Although not shown to be so, the sharp points 182 of the release disc 176 may also have a gradually decreasing thickness, terminating at a knife edge. The direction of rotation of discs 174 and 176 is clockwise in FIG. 8.

In practice, the discs 174 and 176 are rotated at a speed sufficiently high to pass chips as fast as they arrive. However, in the following description of the mode of operation of the discs, it is assumed for convenience of description that the discs are rotating at a much lower speed. Accordingly, film chips which have been transported from the infeed section by the air stream will tend to accumulate against the release disc 176. The top edge of the film chips, identified in FIG. 8 by numeral 184, resides at a level which is just above the level of the points 180 and 182 of the two discs when in six o'clock position. Thus, as the film chips travel down the rails, they will tend to accumulate on the upstream side of the discs. They are retained there by the air pressure gradient. Assume that at a given instant a first chip is leaning against a point 182 of disc 176. Since the points 182 of release disc 176 are the only parts of the disc which can engage the film chip, it follows that the first film chip is supported by the release disc for only a limited time. This time is the time required for a point 182 of the release disc to travel below the top edge 184 of the first film chip, continue through six o'clock position, and then pass up again above the top edge of the film chip. During this interval the next successive point 180 on the separation disc 174 slices between the first chip leaning on the release disc 176 and the second chip which is leaning on the first chip. Thus, when the point 182 of the second disc moves out from behind the first chip thereby releasing the first chip, the second chip will be held by the next successive point 180 on the separation disc 174. The second chip will continue to be held by this point so long as this point is behind the second chip, and when this point moves out from behind the second chip, it will be followed immediately by the next occurring point 182 of the second disc. The latter point will then support the second chip, which is now in the position occupied by the first chip previously released. This second chip will then be held by said next successive point 182 until that point has moved out from behind it. As each chip is released by disc 176, it will immediately zoom down the rails under the influence of the air pressure gradient. It has been determined in practice that this chip release mechanism is capable of very reliable and fast operation in the range of 25 to 100 chips per second, without any appreciable wear on the chips.

Shaft 178 is driven by a system now to be described. As seen in FIG. 8, shaft 178 carries a pulley 188 which is driven by a belt 190. Belt 190 is mounted on a pulley 192 which in turn is mounted on a shaft 194. Shaft 194 carries a large pulley 196 which is driven by a belt 198. Belt 198 in turn is mounted on a pulley 200 which is mounted on a shaft 202. This shaft is connected by means of an electromagnetic clutch C2 and a shaft 204 to the motor M2. Shaft 202 is also attached to an electromagnetic brake B2, whose housing is affixed to a suitable wall member 206. Shaft 178 is driven from motor M2 through clutch C2 only so long as the clutch is engaged. The brake B2 is normally disengaged and it is engaged at the same time that the clutch C2 is disengaged. In this manner the brake B2 operates to bring the discs 174 and 176 to a rapid stop.

Due to the high speed at which the chips travel along the rail system, as well as the high speed at which the discs 174 and 176 rotate, there exists the possibility that at the instant that a signal is transmitted to the brake B2 to stop rotation of the discs, a film chip will be released by disc 176. This released chip will interfere with optical projection of the information on the preceding chip, which, in the normal course of events, would be the chip which prompted the delivery of a signal to brake B2. Accordingly, some means must be provided to stop movement of this released chip before it is in a position to interfere with projection of the information on the selected preceding chip. The means for accomplishing this is illustrated in FIG. 3. This means comprises an electromagnet 210 and a level 212 which is pivoted for limited movement. One end 214 of lever 212 is positioned so as to be attracted by the magnet. So long as the magnet is de-energized, end 214 of the lever is displaced from the magnet and the opposite or forward end of the lever hangs down. Pivotally secured to the forward end of the lever is a chip trap element comprising a horizontal section 216 and two depending fingers 218 and 220. These two fingers are sufficiently long to hang down in intercepting relation with chips on the four rails so long as the magnet 210 is de-energized. However, when the magnet is energized, the fingers 218 and 220 are raised to a level above the film chips on the guide rails, thereby permitting chips to move along the rails without interruption. In practice, magnet 210 is energized at the same time as clutch C2. Thus, so long as the discs 174 and 176 are feeding film chips, the trap comprising fingers 218 and 220 will be in elevated position. However, as soon as a signal is generated to terminate operation of discs 174 and 176, the fingers immediately will drop down in position to terminate flow of film chips beyond the point at which the fingers are located.

In practice, magnet 204 and lever 212 are part of a conventional relay which also comprises a plurality of contacts (not shown) which close (or open) when the magnet is energized. These contacts are used for different purposes as, for example, to establish a holding circuit for the magnet since the magnet will be energized by a short pulse of electric current. These circuit features are not novel, but are purely conventional and, therefore, are not believed to require further description or illustration.

FIG. 10 illustrates the sensing unit which is generally identified by the numeral 226. This sensing unit 226 is mounted alongside the rails 12 and 14. It consists of a plurality of magnetic reading heads 228. It is to be noted that all of the magnetic heads 228 are disposed between the two tracks 12 and 14. However, they do not extend into the passageway traveled by the film chips. Therefore, the sensing unit in no way impedes travel of the film chips. For ease of access to the sensing unit, it is preferred that the rails be in sections in the area of the sensing unit. The preferred embodiment is to utilize a short connecting section of rail, as for example, the connecting sections 14*b* and 18*b* which sections are connected to the corresponding sections 14 and 18 by means of short straps 230. The latter are removably secured to the rails and the removable sections by means of screws 232.

In the illustrated embodiment the magnetic heads are aligned in a vertical plane. Therefore, since the film chips are inclined at a 45° angle, it follows that all of the encoded information on the stripe 30 will not be read simultaneously. Instead, a serial output will result, with the encoded information located at the top or leading end of stripe 30 being read first and the encoded information recorded adjacent the bottom or trailing end of stripe 30 being read last. However, if desired, the sensing unit may be oriented at a 45° angle so that the different read heads 228 will read all of the coded information on the stripe 30 at once.

Although the coded identification information is recorded on the stripe 30 but is edge read by the heads 228, it is to be understood that optical coding is also feasible, placed either near the edge of the film chip or on one of its surfaces.

Assuming that a film chip moving past the sensing unit 226 has been determined by the latter to have the desired identification code, some means must now be provided for making the selected chip available for use, either in a projection system or by some other means. One way to make the selected chip available for in-system use is to trap the selected chip after it has passed the sensing unit 226. Preferably, this is accomplished by a second trapping unit substantially similar to the trap already described for stopping chips which have been released by the release mechanism just after the sensing unit 226 has sensed that a preceding chip has the desired identification code.

As seen in FIGS. 3 and 11, the second trap consists of a magnet 240 which is mounted directly above the four rails on a carriage 242. The latter is described hereinafter in connection with the optical projection system. Pivotally mounted above the magnet 240 is an arm 244. Arm 244 is biased by a spring (not shown) so as to be displaced from the magnet 240 when the magnet is not energized. At the end opposite its pivoted end, the arm 244 carries a trap element which consists of a horizontal section 246 and two depending fingers 248 and 250. The connection section 246 is rotatably connected to the arm 244. So long as the magnet 240 is not energized, the fingers will be held in elevated position and film chips will be free to pass beneath them. However, upon energization of the magnet, the fingers 248 and 250 will drop down to a level where their bottom ends will be in position to stop and support a film chip 2 as shown in FIG. 11.

Referring now to FIGS. 3 and 12–18, the projection system embodying the present invention includes the carriage 242 which comprises a pair of spaced vertical plates 260*a* and 260*b* connected by a transverse member 262 on which magnet 240 is mounted. Vertical plates 260*a* and 260*b* are mounted for movement along a pair of guide rods 264. Only one of these rods is visible in the drawings. The second rod is located behind the carriage adjacent to a vertical wall 266 which is mounted on table 40. The carriage is movable along guide rods 264 between predetermined limits inside guide rod supports 268 and 270. It is to be noted that the table 40 is provided with a large opening 272 in order to accommodate certain apparatus hereinafter described. The carriage carries two glass plates 276 and 278. Glass plate 276 is mounted in a rectangular frame 280 secured at one end to a shaft 282 which is rotatably supported by the vertical plates 260*a* and 260*b*. Frame 280, when in a horizontal position, is located above the top rails 12 and 16 a distance sufficient so as not to interfere with movement of the film chips. The bottom glass plate 278 is mounted in a rectangular frame 286 which is secured to a transverse shaft 288 that also is rotatably supported by the carriage plates 260*a* and 260*b*. When the frame 286 is in a horizontal position, it is below the level of film chips traveling along the guide rails.

Shafts 282 and 288 are provided on their ends adjacent the vertical partition 266 with arms 290 and 292. These arms are provided with cam rollers 294 and 296, respectively.

Cooperating with cam roller 294 is a cam plate 300 (FIGS. 18*a, b, c*) that is attached to the vertical wall 266. Cooperating with the cam roller 296 is a second cam plate 302 which also is attached to the vertical wall 264. The top cam plate 300 has an inclined cam surface 304 which terminates in a horizontal cam surface 306. The bottom cam plate 302 has an oppositely inclined cam surface 308 and a corresponding horizontal cam surface 310. Since the shafts 282 and 288 are offset from each other, it is necessary for the cam plates 300 and 302 to be displaced correspondingly from each other. In this way, the rollers 294 and 296 will engage corresponding portion of cam plates 300 and 302, respectively.

When the carriage is in its forward position, as shown in FIG. 18*a*, the glass plate frames 280 and 286 will be in a horizontal position. They will be maintained in this position by cam surfaces 304 and 308 acting on arms 290 and 292 through rollers 294 and 296, respectively. Opposing the forces exerted by the cam surfaces on the cam rollers are springs 312 and 314 (see FIG. 13). These springs are connected between carriage plate 260*a* and arms 290 and 292 so as to urge shafts 282 and 288 counterclockwise (as viewed in FIGS. 18*a, b,* and *c*). As the carriage moves rearwardly, the cam rollers will move along the inclined surfaces 304 and 308 toward the horizontal surfaces 306 and 310 and, as they do so, springs 312 and 314 will cause the glass plate frames to swing toward each other. By the time the rollers reach horizontal surfaces 306 and 310, the glass plate frames 280 and 286 will have assumed 45 degree positions as illustrated in FIG. 18*b*. They will maintain these positions so long as rollers 294 and 296 are on the horizontal cam surfaces 306 and 310.

Movement of carriage 242 is accomplished by a reversible motor M3 (FIGS. 3 and 13). The output shaft of this motor carries a gear 318 which meshes with a rack 320 attached to the vertical carriage plate 260*b*. The distance through which carriage 242 can be moved by operation of motor M3 is determined by two limit switches 322 and 324 which are disposed on table 40 alongside the carriage. Two other switches 326 and 328 are located at intermediate points between limit switches 322 and 324. In addition two similar switches 330 and 332 are located in side-by-side relation with limit switch 324. Switches 326 and 328 are motor controlling switches and their function is to stop the carriage 242 at two different points along guide rods 264, whereby to permit optical projection of the upper half of the trapped film chip at the first of said two points and projection of the lower half of the trapped chip at the second of said points. How this is accomplished is explained hereinafter. Of course, the optical system could be made to project all of the data on a film chip in one shot, in which case a single central switch would be used in place of switches 326 and 328. It is to be noted the switch 326 is located at a point corresponding with the beginning of horizontal cam surfaces 306 and 310. The function of switches 330 and 332 is explained hereinafter.

The foregoing switches are operated by a bar 334 attached to carriage 242. Bar 334 is positioned so as to actuate switches 330 and 332. Bar 334 has a lateral extension 336 which is disposed so as to actuate switches 322, 326, 328 and 324 in turn. The length of bar 334 is such that it will operate switches 330 and 332 at the same time that projection 336 operates switch 326. It will continue to operate switches 330 and 332 as the projection 336 passes from switch 326 to switch 324. When switch 330 is normally open and when it closes it energizes a projection lamp 337 (FIG. 18*b*) contained within a projection lamp housing 338 (FIGS. 3 and 12). Switch 332 is in the holding circuit of magnet 240. Switch 332 is normally closed and when it is opened, it de-energizes the magnet so as to lift fingers 248 and 250 out from behind the chip previously trapped thereby. It is to be noted that the fingers 248 and 250 are located slightly downstream of the upper glass frame 280 so as not to interfere with movement thereof. Restoring the fingers to their normal elevated position is necessary so that when subsequently the glass frames are pivoted back to their normal horizontal positions, the film chip will be free to resume travel along the guide rails. It is to be noted also that as the bottom glass frame 286 swings upward to its forty-five degree use position, it pushes the trapped film chip off of the fingers 248 and 250 and shifts it back along the rails toward the downwardly swinging top glass frame 280. The amount of movement of the chip along the rails is relatively small, being just long enough to free it from the fingers.

Obviously, the two glass plate frames will begin to return to their horizontal positions as soon as the cam rollers begin to ride back along inclined cam surfaces 304 and 308. However, the film chip previously sandwiched between the two glass plates will not be free to travel along the four guide rails to its ultimate destination until the bottom glass frame has swung below the bottom edge of the chip. The ultimate destination may be a reservoir or a magazine, thereby providing automatic filling of the magazine.

Before completing the description of the projection system embodying the present invention, reference is had to FIGS. 3 and 19 where a third trapping unit 340 is displayed. This third trapping unit is located downstream of the optical projection stage. This third trapping unit comprises electromagnet 342 having an arm 344 which is biased by a spring 346 (FIG. 3) away from the end of the magnet 342. Arm 344 has at its upstream end a downwardly extending leg 348 which is provided with a T-shaped terminal portion 350. Normally, the magnet 342 is de-energized and the arm 344 is elevated so that the terminal portion 350 is above the level of film chips on the four rails. When the magnet is energized, the arm is drawn down sufficiently to interpose the T-shaped section 350 in the path of film chips traveling on the guide rails. At the location of the T-shaped section 350, the guide rails are split, as illustrated at 352 in FIG. 1 and also FIG. 19. Although not fully visible in the drawings, the bottom guide rails are split at the same point. The gap at the split is larger than the thickness of a film chip. Thus, when magnet 342 is energized so as to trap a film chip, the film chip which is trapped may be removed through gaps provided by the splits 352 in the rails. The magnet 342 is energized by means forming part of the control circuit when it is determined as a result of inspection of the film chip by the sensing unit that a bit of its encoded indicia is missing from a spot where the bit should normally be present. When this occurs, the control system will not cause the film chip to be trapped by the second trap associated with the projection mechanism. Instead, it will allow the film chip to travel along to the third trapping mechanism, where it will be stopped for manual removal from the four-rail system. When the top end of a chip is stopped in the gaps in the top rails by the T-shaped section 350, it will tend to flip over so that its bottom end will be in a leading position. However, it is prevented from doing so by a stationary bar 353 which is disposed below the bottom rails 14 and 18 in the region of their splits 352. Bar 353 is so located that it will not interfere with a chip so long as the chip is in its normal inclined position; but will block the bottom end of a chip held back by T-shaped section 350 when the chip moves to a near vertical position.

It is to be noted further that the ends of the rails 12 14, 16 and 18 terminate in a downwardly extending branch formed by rail sections 12*c*, 14*c*, 16*c* and 18*c*. The corner formed by the rails 12 and 16 with the rail sections 12*c* and 16*c* preferably is covered with an angle member 354 which preferably is transparent. This angle member is not in position to obstruct movement of film chips. Instead it functions as a baffle to deflect the air stream downward. When the film chips reach the end of the tracks 14–18, they turn the corner and then travel downwardly along the guide rails 12*c*, 14*c*, 16*c* and 18*c*. In this manner, it is possible to deliver the individual film chips into a storage hopper or even into a supply magazine. If desired, auxiliary air feed mechanisms may be provided whereby film chips which are stored in a reservoir or magazine located at the bottom ends of rails 12*c*, 14*c*, 16*c*, and 18*c*, may be blown back up onto the guide rail system previously described so as to be re-read by the sensing unit, but in a reverse direction, or so as to be returned to the original feed magazine. In this way automatic reloading of the original magazine will be accomplished with the film chips in their original positions.

Referring now to FIGS. 12 and 14–17, the vertical partition 266 supports various elements which form part of the optical projection system. The vertical partition 266 has two pairs of parallel bearing guide blocks, 360, 362, 364, and 366. All but bearing block 366 are visible in FIG. 12; bearing block 366 is shown in FIG. 17. It is to be noted that bearing blocks 360 and 362 are in alignment with each other along a given inclined plane. The two blocks, 360 and 362, support a first stationary guide rod 370. They also include bearing members for slidably supporting a movable guide rod 372. The other two guide blocks, 364 and 366, also support a stationary guide rod 374, as well as a slidable guide rod 376. Mounted on guide rod 370 is a rectangular block 380.

Block 380 also has a second hole through which extends the guide rod 372. Block 380 is slidably mounted on rod 370 but is fixed to rod 372. Therefore, block 380 and slide rod 372 will move as a unit. Block 380 has a laterally extending bore through which extends a shaft 384 (FIG. 14). Attached to one end of this shaft is a mirror frame 386. The opposite end of shaft 384 extends through an inclined slot 387 formed in vertical partition 266 and carries a rotatable pulley 388. The end of shaft 384 also extends through a slot 390 formed in an elongated arm 392. Attached to the extremity of shaft 384 is a small link 396. Link is not rotatable relative to shaft 384.

Mounted on the guide rod 374 for slidable relative movement is a lens mount generally identified by the numeral 398. The guide rod 376 extends through and is securely fastened to the lens mount 398. Therefore, the lens mount 398 will move with the guide rod 376.

Referring now to FIG. 14, the link 396 is pivotally secured to an elongated link 400 which is disposed parallel to the elongated link 392. A second short link 402 is connected to the two links, 392 and 400 parallel to the other short link 396. It is to be noted that the upper end of the link 396 has a pivot pin 404 which is disposed in an elongated slot 405 in one end of the top elongated arm 400. The opposite ends of elongated arms 392 and 400 are pivotally secured to a small pivot shaft 406 and a pivot pin 408. Shaft 406 is mounted on and extends through a plate 266*a* which is fixed to and functions as an extension of the partition 266. Shaft 406 has secured to its opposite end a mirror frame 410. The mirror frame is firmly secured to the shaft 406 so as to rotate therewith. The pivot pin 408 which supports the link 400 is mounted on a triangular arm 412 which has a lateral extension 414 which is secured to the mirror frame 410. Arm 412 is mounted on and is rotatable relative to shaft 406. Pivotally connected to the elongated link 392 at a point intermediate the ends thereof, is an L-shaped crank arm 416. Crank arm 416 has an elongated slot 418 which accommodates a pivot pin 420 carried by link 392. Crank arm 416 is pivotally secured to plate 266*a* by means of a short pivot pin 422. The opposite end of the crank arm 416 is provided with a pivot pin 424 which supports a link 426. The opposite end of link 426 is rotatably mounted on pivot pin 408. It is to be noted in passing that the distance between shaft 406 and pivot pin 420 is identical to the distance between shaft 406 and pivot pin 422.

Attached to the upstream or free end of the elongated lever 392 at point 430 is a wire string 432. Wire string 432 passes around an idler pulley 434 mounted on a stub shaft 435 which is rotatably mounted in the vertical wall 266. The opposite end of the string 432 is attached to a tension spring 436 which is anchored adjacent the bottom end of the vertical wall 266. It is believed to be apparent that the effect of spring 436 is to pull on the string 432 so as to urge the elongated link 392 to pivot upward about the axis of shaft 406.

As seen in FIGS. 12, 16 and 17, the lens mount 398 comprises two parallel plates 444 and 446. These two plates are secured to each other by means of a pair of connecting plates 448 and 450. The latter is broken away in FIG. 17 for convenience of illustration. The two plates 444 and 450 have aligned openings in order to accommodate a lens system generally identified by the numeral 450. Extending through these two connecting plates 448 and 450 is a rotatable shaft 452 on the end of which is mounted a gear 454. Interposed between the two plates 444 and 446 is a movable L-shaped element 460 which carries on its bottom edge a rack 462. The movable element 460 has a lateral extension 463 (FIG. 16) which has a hole through which slidably extends the guide rod 376. Secured to this movable portion 460 and its lateral extension 463 by screws (not shown) is a flat L-shaped plate 466 which overlies the upper edge of the lens mount plate 446. The flat plate 466 is provided with an elongated slot 468 through which extends a set screw 470 having an enlarged head. Set screw 470 is screwed into the spacer plate 450. When the set screw is turned down tight, the flat plate 466 and, therefore, the movable member 460 and the rack 462, are incapable of movement relative to the two plates 444 and 446. Similarly, extension 463 of movable member 460 is incapable of movement relative to the guide rod 376. However, when the set screw is backed off, the movable member 460 may be moved relative to the two plates 444 and 446 by rotation of shaft 452 which is fitted with a knob 472 for each manipulation.

Attached to the rear end of the flat plate 466 is a cam wheel 476. Cam wheel 476 rides on an inclined cam surface 480 provided by a plate 482 which is attached to the inside carriage plate 260*a* (see FIGS. 13 and 17). Cam surface 480 is at the same angle as the chip sandwiched between the two glass plates 276 and 278.

It is to be noted, as seen best in FIGS. 14 and 16, that the lens mount plate 444 is provided with two parallel extensions 490 which extend through separate but identically inclined slots 494 formed on the vertical wall 266. Attached to these extensions is a short bar 498 which is inclined downwardly toward the upstream end of the machine. Attached to the upstream end of the bar 498 is a spring 500 and also a wire string 502. The bottom end of the spring 500 is attached to the vertical panel 266. String 502 passes around rotatable pulley 388 and then extends rearwardly parallel to the two long links 392 and 400 to a circular disc 508 which has the same diameter as pulley 388 but which is stationary. Disc 508 is secured to vertical plate 266*a* and shaft 406 passes through it. String 502 is secured to the periphery of disc 508. It is kept taut under the influence of pulley 388 which is influenced by the pull of spring 436 and string 432 acting through link 392 and shaft 384.

From the foregoing description it will be appreciated that the lens mount assembly 398 and guide rod 376 are movable as one unit and that guide block 380, mirror 386, and pulley 388 are movable as a separate unit along parallel inclined paths determined by guide rods 374 and 370 respectively. However, they are connected by string 502. Accordingly, in addition to urging the lens mount assembly downward along guide rod 374 so as to maintain cam roller 476 in engagement with cam surface 480, spring 500 urges pulley 388 and, therefore, mirror frame 386 to do the same in opposition to the tension exerted by spring 436 acting through string 432.

When the carriage moves toward the infeed end of the machine the lens mount and mirror frame 386 will move upward; correspondingly, when the carriage moves in the opposite direction, they will move downward. This means that the distance between the lens system 450 and a film chip sandwiched between the glass plates 276 and 278 will remain constant for different positions of the carriage. However, to keep in focus the image projected on the screen 166, it is necessary also to maintain a constant distance between the lens and the screen. Part of this distance, i.e., between mirror frame 410 and screen 166, already is fixed. However, the distance between mirror frame 386 and mirror frame 410 will change as mirror frame 386 moves along the inclined path determined by guide rods 370 and 372. Accordingly, it is necessary to maintain constant the distance between the lens mount and mirror frame 410 regardless of a change in the distance between the two mirror frames. This is achieved by string 502 which extends from bar 498 (connected to the lens mount substantially in the plane of plate 444) around pulley 388 (mounted on an axis which is located in the plane of mirror frame 386) to disc 508) whose axis is located in the plane of mirror frame 410). Since the length of string 502 is fixed, and since it is always maintained taut, a change in the length of that portion of the string between pulley 388 and disc 508 will always be accomplished by an opposite change in the length of that portion of the string between pulley 388 and bar 498. Since pulley 388 and disc 508 are of equal size, an increase or decrease in the amount of string wrapped around pulley 388 will be accompanied by an opposite change in the amount of string wrapped around disc 508. Therefore, the wrap-around phenomenon is effectively cancelled out as a source of error.

However, it is not sufficient to keep constant the distance between the lens mount and the mirror frame 412. It is also necessary that the two mirror frames always be in position to direct the projected image onto the screen 166. Unfortunately, when the mirror frame 386 shifts its position, it creates a new angular relationship with mirror frame 410, thereby disturbing the path of a beam of light, projected by the lens system. This phenomenon can be explained by reference to FIGS. 18*a*, *b*, and *c*. FIG. 18*a* shows the carriage in its rest position, with a cam roller 476 at the top of cam surface 480. FIGS. 18*b* and *c* show the carriage in its two different use positions, with the lamp 337 energized to direct a light beam 520 through the film chip 2 and the lens system 450. As will be observed from a comparison of FIGS. 18*b* and 18*c*, the lens system and mirror frame 386 are lower in FIG. 18*c*.

Consider now a first line drawn from the center of mirror frame 410 to the center of mirror frame 386 when the latter is in the position of FIG. 18*b*, and a second line drawn between the same two centers when mirror frame 386 is in the position of FIG. 18*c*. These two lines will intersect at an angle $\alpha$ at the center of mirror frame 410. This new angular relationship creates new angles of incidence and reflection which disturb the path of light beam 520 so that the projected image wholly or partly misses the screen.

The function of the linkage between the two mirror frames is to rotate them in synchronism with the straight line movement of mirror frame 386 so as to adjust automatically for changes in the distance between the two mirror frames. The linkage accomplishes this in the manner now to be described.

When the mirror frame 386 shifts to produce a new angular relationship characterized by the angle $\alpha$ as previously described, the elongated link 392 will rotate on its pivot 406 through the same angle. As a consequence, crank arm 416 will rotate on its pivot 422 through an angle equal to $\alpha/2$. Due to the coupling effected by link 426, arm 412 and, therefore, mirror frame 410, will rotate through the same angle, namely, $\alpha/2$, as crank arm 416. Similarly, because of the parallel linkage comprising arm 412, links 392 and 400, and links 396 and 402, shaft 384 and, therefore, mirror frame 386 will rotate through an angle of $\alpha/2$ degrees. The two mirrors will rotate in the same direction. Therefore, the angular adjustments of the two mirror frames is additive, giving the desired total correction of $\alpha$ degrees.

It is to be noted in passing that the illustrated linkage makes use of the geometric principle that the angle between two given radii of a circle is always equal to twice the angle between two chords which emanate from a common point on the circle and terminate at the same points on the circle as do the two radii. In this case pivot point 406 corresponds to the center of the circle, and pivots 420 and 422 correspond to points on the circle itself. However, since pivot 422 is fixed, the portion of crank 416 between pivots 420 and 422 will correspond to a chord of the circle whereas link 392 will correspond to the radius of the circle. As a consequence of this arrangement, the crank arm will always rotate half as much as link 392.

FIG. 20 illustrates a suitable electrical system for operating and controlling the mechanisms which have been just described. In this figure solid lines represent electrical connections and broken lines indicate mechanical connections.

Fan motor M3 and main motor M2 are energized directly from a suitable alternating current power source 530 through suitable manual switch means (not shown). In addition current is supplied from source 530 to a power supply 532 for a coincidence detector 534. The latter is illustrated in more detail in FIG. 21. The lens carriage motor M3 is supplied with current either directly through a manually operated positioning and reversing switch system 536 or through a relay 538 and an automatic positioning and reversing switch system 540. Output signals from the coincidence detector 534 are used to operate clutches C1 and C2 and brakes B1 and B2 in the sequence previously described. Additional outputs from coincidence detector 534 are used to operate the several traps and relay 538.

The coincidence detectors 534 comprises a multi-channel preamplifier 544 which amplifies the several inputs from the magnetic sensing unit 226 and applies them to a multi-channel flip-flop unit 546 wherein each input operates a different flip-flop. An automatic reset circuit 548 is provided to clear all of the flip-flops between signals from successive chips. The output from flip-flop unit 546 is applied to a coincidence comparator 550 where the pulse output is compared with accession signals produced by a desired accession number unit 552. The latter can be set to produce different combinations of signals each representative of a different binary number. Each time the signals from flip-flop unit 546 match with the signals from the accession number unit 552, the comparator will produce an output signal that is applied to a trigger circuit 554 to generate a pulse to operate the No. 2 trap, i.e., energize magnet 240, and also to operate the No. 1 trap, i.e., to de-energize magnet 210.

Coincidence comparator 550 is also designed to generate a special output when the output from flip-flop unit 546 lacks one or more bits of information. The special output is applied to a second trigger circuit 556 which generates a pulse to operate the No. 1 and No. 3 traps, i.e., magnets 210 and 342. A reset circuit 560 (FIG. 20) is provided to de-energize magnets 210 and 342 after removal of the trapped film chip which has been found to lack a bit of its identifying code.

The manual and automatic positioning and reversing units 536 and 540 both include switches 332, 326, 328 and 332. In the case of manual unit 536, the carriage will stop when switches 326 and 328 are triggered and will not start again until a separate control switch (not shown) is manually operated. In the case of automatic unit 540, the carriage will stop when switches 326 and 328 are actuated, but will start again after a predetermined time delay. With both units 536 and 540, the carriage will not return to its normal position until it has traveled its full stroke so as to operate reversing switch 332. When limit switch 332 is actuated on the return stroke of the carriage, it will actuate a relay (not shown) which will re-establish energization of clutches C1 and C2 and magnet 210, thereby restoring the flow of sheets along the rails. Of course, brakes B1 and B2 are released when the clutches are energized.

It is to be observed that the electrical circuits and components which are illustrated schematically in FIGS 20 and 21 are well known to persons skilled in the art of data processing machinery and motor controls and, for this reason, a more elaborate exposition of their construction is not believed to be necessary.

Although not necessary, it is preferred that film chips be corrugated adjacent each edge as shown at 564 and 566 in FIG. 9. This is achieved by a simple molding operation. The corrugations resist deformation of the film chip in the plane of its path of travel, thereby eliminating any chance that the chips will bind on the rails.

Of course, it is not necessary that the film chips be projected by the system previously described. Instead they may be removed from the system for viewing by means of a separate slide projector. The chips may be removed through the gaps 352 or through other gaps provided elsewhere in the system. If gaps 352 are to be used, the third trap, i.e., magnet 342, will be disconnected from the dropout trigger circuit 556 and connected instead to the coincidence trigger circuit 554. Of course, the second viewing trap, i.e., magnet 240, will be disconnected from trigger circuit 554 Thus when the sensing unit 226 determines that a particular chip has the desired code, it will actuate magnet 342 instead of magnet 240. Operation of magnet 342 will immediately cause arm 344 to swing down so that its terminal portion 350 will be in position to stop the desired chip. The chip may then be removed manually via the gaps 352. Of course, the same result can be obtained by introducing an extra trap into the system instead of using the third trap as just described. This approach has the advantage of retaining the normal function of the third trap, i.e., to stop all chips which have been found to lack a complete identifying code. It is to be noted that removal of selected chips through gaps 352 need not be solely for the purpose of making use of a separate projection system. Instead it may be for the purpose of simple classification, i.e., of separately collecting all chips having corresponding identifying codes.

The concept of mounting the data-bearing sheets on the guide rails at an oblique angle to their path of travel is basic to the data processing apparatus just described. If the spacing between the upper and lower pairs of guide rails should be increased so that the chips can be oriented at a right angle to the longitudinal axis of the guide system, the chips would not travel in the uniform fashion previously described. Instead, at a relatively slight imbalance of forces therein, they would fall off of the rails. Reducing the spacing between the upper and lower guide rails prevents this from occurring. In practice, the spacing between the rails is reduced to an amount just short of causing the chips to bind. In this connection it is to be noted that each of the notches 4, 6, 8 and 10 of data-bearing sheets 2 is defined by three guide-engaging surfaces. These surfaces should contact the rails without binding but with a minimum amount of shifting up, down, or sidewise. As a consequence the sheets will travel along the rails at a constant angle to their path of travel and with substantially no vertical or sidewise displacement, thereby assuring accurate read-out by the sensing unit.

Incidentally, although the rails have been illustrated as straight members, it is to be noted that they may be curved in a horizontal plane so that the data-bearing sheets can be made to travel in a direction which is parallel but opposite to its original direction.

It is contemplated also that the film chips may be mounted in a frame with the notches for the guide rails formed in the surrounding frame. This has the advantage of permitting the film chip to be utilized in a slide projector. Of course, the coded identifying indicia would be carried directly by the surrounding frame.

It is to be noted also that a data-bearing sheet 2 could be provided with a second magnetic striping along the edge opposite from the first striping, and that a second sensing unit could be mounted adjacent to rails 16 and 18 for the purpose of reading information recorded in the second striping. This doubles the number of identifying code bits which can be recorded on the sheets and also the number of code bits which can be read simultaneously.

A not insignificant advantage of a data processing machine of the type just described is that it can be used for counting as well as reading and classifying. In this connection it is to be noted that in certain situations counting can be effected with a single channel reading head. A typical example is where it is desired to count chips. In other situations a multi-channel reading head may be required for counting. A typical example of the need for a multi-channel head is where each chip has a multi-bit code representative of a number and it is desired to count all of those numbers to obtain a total.

Another advantage of such a machine is that additional data-bearing sheets may be inserted into the system downstream of the infeed section. This may be done via the gap provided by a split in the rails, such as the aforementioned split illustrated at 352 in FIGS. 1 and 19. In the illustrated embodiment the sheets must be inserted from the bottom up through the lower rails 14 and 18 in order to have them oriented with their top ends in a leading position. To have their top ends in trailing position, the sheets are inserted down through the top rails. Insertion may be made while sheets are being processed or when no sheets are traveling on the rails. In the former case the inserted sheet will block oncoming sheets while it is being inserted. However, as soon as it is in place and released, it will be propelled down the rails followed by the sheets which it has temporarily blocked.

The advantages afforded by an optical system embodying the present invention are notable. First, of all, it permits projection of recorded data images without first extracting the data-bearing sheets from the machine. Secondly, where a film chip has several frames, it permits projection of each frame individually. Thirdly, it achieves accurate and dependable focusing and projecting of images. Fourthly, it is operable automatically while at the same time permitting manual control where desired. Fifthly, it can be designed to handle film chips of larger or smaller size. Sixthly, it can handle different kinds of data-bearing sheets, i.e., simple film chips, film chips that are mounted in a frame suitable for use in a slide projector, or punched card-mounted film chips.

Obviously, many modifications and variations of the present invention are possible in the light of the above teachings. Therefore, it is to be understood that the invention is not limited in its application to the details of construction and arrangement of parts specifically described or illustrated, and that within the scope of the appended claims, it may be practiced otherwise than as specifically described or illustrated.

I claim:

1. A data processing system, comprising:
   - a plurality of guide means for slidably supporting at an angle oblique to said guide means a plurality of like sheets each adapted to contain selected data;
   - means for establishing a fluid pressure gradient along a channel defined by said guide means whereby said sheets will be displaced along said channel in a direction determined by said gradient;
   - means at a predetermined location along said channel for stopping a desired sheet;
   - means at said location for supporting said stopped sheet at said oblique angle, and
   - a projection system including a light source located on one side of the path of travel of said sheets and aimed to transmit a beam of light through said each sheet whereby to reproduce an image therefrom and a lens system positioned to magnify the image projected by said beam.

2. A data processing system as in claim 1 wherein said sheet supporting means is mounted on a carriage which is movable parallel to said guide means.

3. A data processing system comprising:
   - a plurality of guide means for slidably supporting at an angle oblique to said guide means a plurality of like sheets each adapted to contain selected data;
   - means for establishing a fluid pressure gradient along a channel defined by said guide means whereby said sheets will be displaced along said channel in a direction determined by said gradient;
   - means at a predetermined location along said channel for stopping a desired sheet;
   - means at said location for supporting said stopped sheet at said oblique angle said sheet supporting means mounted on a carriage that is movable parallel to said guide means;
   - a projection system including a light source for directing a light beam through said stopped sheet whereby to project an image therefrom and a lens system for magnifying the image projected by said beam; and
   - means for moving said lens system along its lens axis whereby to maintain a constant distance between said lens system and said each sheet supported by said supporting means as said carriage is moved along parallel to said guide means.

4. A data processing system as in claim 3, wherein said projection system includes a mirror for reflecting said magnified image onto a preselected surface, and means for changing the angular position of said mirror in synchronism with movement of said carriage whereby said mirror will continue to reflect said image onto said surface as said carriage is moved.

5. A data processing system as in claim 4 wherein said light source includes a switch for operating said light source, and means attached to said carriage for actuating said switch when said carriage reaches a predetermined point.

6. A data processing system as in claim 5 wherein said light source includes means for operating said light source only when a sheet is supported by said movable supporting means.

7. A data processing system as in claim 6 wherein said lens system is mounted for movement along a path normal to the plane of said each sheet.

8. A data processing system as in claim 7 wherein said projection system includes a projection screen, a mirror system for reflecting said magnified image upon said screen, and means for automatically adjusting said mirror system as said lens system is moved in a direction normal to said stopped sheet, whereby said image will continue to be reflected onto said screen.

9. An optical system for use in a data processing system comprising a carriage movable back and forth along a predetermined path, means on said carriage for supporting a light-transmitting data-bearing sheet at an oblique angle to said path, a lens system disposed with its optical axis normal to the plane of a data-bearing sheet supported by said supporting means, stationary means supporting said lens system for reciprocal movement along said optical axis, said lens system normally displaced a selected distance from said plane whereby to establish proper focusing of an image projected from said data-bearing sheet by a light beam, and means for shifting said lens system along said optical axis in synchronism with movement of said carriage along said path whereby to maintain said selected distance between said lens system and said plane.

10. A data processing system comprising a plurality of guide means for slidably supporting a plurality of like sheets each adapted to contain selected data, means for establishing a fluid pressure gradient along a channel defined by said guide means whereby said sheets will be displaced along said channel in a direction determined by said gradient and at an oblique angle to said channel, means at a predetermined location along said channel for stopping a desired sheet, means at said location for supporting said stopped sheet at said oblique angle, and a projection system including a light source for directing a light beam through said stopped sheet whereby to project an image therefrom and a lens system for magnifying the image projected by said beam.

11. A data processing system as in claim 10 wherein said sheet supporting means and sheet stopping means are movable into and out of said channel.

12. A data processing system as in claim 11 wherein said sheets are uniquely coded and said sheet supporting and stopping means are moved into said channel in response to a signal corresponding to the code on a desired sheet.

13. An optical system for use in a data processing system, comprising:

a carriage movable back and forth along a predetermined path;

means on said carriage for supporting a light transmitting data bearing sheet at an oblique angle to said path;

a lens system disposed with its optical axis normal to the plane of a data bearing sheet supported by said supporting means;

stationary means supporting said lens system for reciprocal movement along said optical axis, said lens system normally displaced a selected distance from said plane whereby to establish proper focusing of an image projected from said data bearing sheet by a light beam;

means for changing the distance between said lens system and said place; and means for shifting said lens system along said optical axis in synchronism with movement of said carriage along said path whereby to maintain said selected distance between said lens system and said plane.

14. An optical system for use in a data processing system, comprising:

a carriage movable back and forth along a predetermined path;

a first mirror, a second mirror and a viewing screen, said first mirror positioned to receive an image transmitted by said lens system and to reflect said image onto said second mirror, said second mirror positioned to reflect said same image onto said viewing screen, and means for moving said first mirror in synchronism with said lens system whereby to maintain constant the length of the path of a light beam passing from said lens system to said second mirror by way of reflection by said first mirror.

15. An optical system for use in a data processing system, comprising:

a carriage movable back and forth along a predetermined path;

a first mirror, a second mirror and a viewing screen, said first mirror positioned to receive an image transmitted by said lens system and to reflect said image onto said second mirror, said second mirror positioned to reflect said same image onto said viewing screen, and means for moving said first mirror in synchronism with said lens system whereby to maintain constant the length of the path of a light beam passing from said lens system to said second mirror by way of reflection by said first mirror, and means for rotating said first and second mirrors in synchronism with movement of said first mirror whereby to correct for changes in angles of incidence of said light beam on said mirrors due to movement of said first mirror.

16. A data processing system having means for transporting a light-transmitting data bearing sheet along a predetermined path with the sheet disposed at an oblique angle to said path, the improvements comprising:

means for stopping said sheet at a predetermined location along said path;

means at said location for supporting a stopped sheet at said oblique angle;

a light source for directing a light beam through said stopped sheet to project an image of said sheet;

a lens system having an optical axis substantially normal to the plane of said sheet for magnifying the projected image;

means for successively displacing said sheet along said predetermined path; and means similarly successively displacing said lens system along its optical axis to scan successively different areas of said sheet.

References Cited in the file of this patent

UNITED STATES PATENTS

| | | |
|---|---|---|
| 1,182,761 | Gamble et al. | May 9, 1916 |
| 2,115,563 | Tauschek | Apr. 26, 1938 |
| 2,295,000 | Morse | Sept. 8, 1942 |
| 2,323,372 | Bryce | July 6, 1943 |
| 2,589,437 | Sabol et al. | Mar. 18, 1952 |

FOREIGN PATENTS

| | | |
|---|---|---|
| 17,076 | Great Britain | May 4, 1901 |